US012034238B2

(12) United States Patent
Yin et al.

(10) Patent No.: US 12,034,238 B2
(45) Date of Patent: Jul. 9, 2024

(54) ELECTRICAL CONNECTOR HAVING AN INSULATIVE COMPONENT

(71) Applicant: ALLTOP ELECTRONICS (SUZHOU) LTD., Suzhou (CN)

(72) Inventors: Dingbin Yin, Suzhou (CN); Zhihui Zhang, Suzhou (CN)

(73) Assignee: ALLTOP ELECTRONICS (SUZHOU) LTD., Suzhou (CN)

( * ) Notice: Subject to any disclaimer, the term of this patent is extended or adjusted under 35 U.S.C. 154(b) by 114 days.

(21) Appl. No.: 17/841,607

(22) Filed: Jun. 15, 2022

(65) Prior Publication Data

US 2022/0311162 A1 Sep. 29, 2022

Related U.S. Application Data

(63) Continuation of application No. 17/099,724, filed on Nov. 16, 2020, now Pat. No. 11,394,142.

(30) Foreign Application Priority Data

Jan. 15, 2020 (CN) ........................ 202010040381.1

(51) Int. Cl.
*H01R 12/70* (2011.01)
*H01R 12/72* (2011.01)

(52) U.S. Cl.
CPC ....... *H01R 12/7064* (2013.01); *H01R 12/727* (2013.01)

(58) Field of Classification Search
None
See application file for complete search history.

(56) References Cited

U.S. PATENT DOCUMENTS

| | | | | |
|---|---|---|---|---|
| 7,195,519 | B1 * | 3/2007 | McAlonis | H01R 13/518 439/701 |
| 8,651,880 | B2 * | 2/2014 | Wu | H01R 13/113 439/79 |
| 9,899,759 | B2 * | 2/2018 | Yu | H01R 13/113 |
| 2007/0270035 | A1 * | 11/2007 | McAlonis | H01R 12/727 439/607.05 |
| 2020/0161791 | A1 * | 5/2020 | Zou | H05K 1/0213 |
| 2021/0013654 | A1 * | 1/2021 | Zhang | H01R 4/70 |

* cited by examiner

*Primary Examiner* — Oscar C Jimenez
(74) *Attorney, Agent, or Firm* — Cheng-Ju Chiang

(57) ABSTRACT

An electrical connector includes an insulating housing having a mating cavity and a contact module. The contact module comprises at least one contact group and an insulative component, the one contact group has a first power contact and a second power contact, each one of the first power contact and the second power contact has a retaining portion, at least one contacting portion and at least one soldering portion. The retaining portions of the first power contact and the second power contact in one contact group are arranged in a height direction in the insulative component, the contacting portions of the first power contact and the second power contact in one contact group are arranged in a transverse direction of the insulating housing, the soldering portions of the first power contact and the second power contact in one contact group are arranged in a front-and-back direction.

20 Claims, 17 Drawing Sheets

ELECTRICAL CONNECTOR HAVING AN INSULATIVE COMPONENT

CROSS REFERENCE TO RELATED APPLICATIONS

The present application is a continuation application of U.S. patent application Ser. No. 17/099,724 filed on Nov. 16, 2020, which claims priority to Chinese Patent Application No. 202010040381.1, filed on Jan. 15, 2020, the content of which is hereby incorporated by reference into this application.

BACKGROUND OF THE INVENTION

1. Field of the Invention

The present invention relates to an electrical connector, and more particularly to an electrical connector with low height.

2. Description of Related Art

A traditional electrical connector uses power terminals with blade-shape in order to improve the surface so that the power terminal can afford to transmit high current. Each power terminal normally has several contacting beams extending from a blade-shaped body. The power terminals are arranged vertically in a stacked manner in order to carrying higher current.

FIG. 1 and FIG. 2 show an electrical connector which is mounted onto a PCB 81, the electrical connector includes an insulating housing 91 and several pairs of power terminals 92 retained in the insulating housing 91, each power terminal of each pair has several contacting portions 921 for contacting with a mating member, two pairs of power terminals 92 have four power terminals which are arranged vertically so that they can carry higher current. When the electrical connector 900 connects with multiple golden fingers 82 and motherboard 83, the center height of the electrical connector 900 is higher than the center height of the motherboard 83, so it is necessary to use an adapter 84 to electrically connect the electrical connector 900 and the motherboard 83.

As mentioned above, in order to make the connection more convenient, the height of electrical connector should be reduced, therefore it becomes much more difficult to make the power terminals and assemble the power terminals into the insulating housing. Additionally, the electrical connector 900 is mounted above the PCB 81, the total height of the electrical connector 900 is higher than a sink-board type electrical connector which is also called under-board type or broken-board type electrical connector, so it cannot connect in a lower height manner and use the space more efficient. Taking an electrical connector having four power terminals vertically as an example, in a traditional assembling process, an upper pair of power terminals are firstly assembled into the insulating housing, and then a lower pair of power terminals with bended soldering legs are assembled into the insulating housing, if the electrical connector has low center height, it will be difficult to bend downward extending soldering legs on the upper pair of power terminals. Meanwhile, if the upper power terminals are bended to form soldering legs in advance and then assembled into the insulating housing, the soldering legs will be an obstacle which can stop the lower pair of power terminals being assembled into the insulating housing.

Hence, it is desired to provide an electrical connector to overcome the problems mentioned above.

BRIEF SUMMARY OF THE INVENTION

Accordingly, an object of the present invention is to provide an electrical connector and an electrical connector assembly preventing contacts thereof heating effectively.

The present invention is directed to an electrical connector comprising an insulating housing having a mating cavity and a contact module defined in the insulating housing, the contact module comprises at least one contact group and an insulative component retaining the contact group, the one contact group has at least a first power contact and at least a second power contact, each one of the first power contact and the second power contact has a retaining portion held in the insulative component, at least one contacting portion extending beyond the insulative component from one end of the retaining portion and at least one soldering portion extending from another end of the retaining portion. The retaining portions of the first power contact and the second power contact in one contact group are arranged in a height direction of the insulating housing in the insulative component, the contacting portions of the first power contact and the second power contact in one contact group are arranged in a transverse direction of the insulating housing, the soldering portions of the first power contact and the second power contact in one contact group are arranged in a front-and-back direction.

The present invention is also directed to an electrical connector assembly comprising an insulating housing, a plurality of power contacts and at least one insulative component retaining the power contacts. The insulating housing defines a mating section and a mounting section connecting with each other in a front-and-back direction, the mounting section has a mounting surface for mounting onto a printed circuit board. Each power contact has a retaining portion, at least one contacting portion extending from one end of the retaining portion and at least one soldering portion extending from another end of the retaining portion, each retaining portion defines an extended part higher than the mounting surface, and the soldering portion bent from the extended part. In a height direction of the insulating housing, the power contacts are defined in pairs and opposite to each other at the mating section, the extended parts of the power contacts on a lower side are not lower than a plane where the contacting portions of the power contacts on an upper side is located, the power contacts and the insulative component are forming a contact module and then assembled into the insulating housing in a back-to-front direction, the insulative component defines a plurality of retaining slots for mounting the retaining portions of the power contacts, the contacting portions extend beyond a front end of the insulative component and to the mating section.

The present invention is also directed to an electrical connector assembly comprising an insulating housing, a plurality of power contact pairs retained in the insulating housing and an insulative component retaining the power contact pairs. The insulating housing has a mounting section, a mating section extending forwardly from the mounting section and a plurality of contact-receiving passageways. The power contact pairs are divided into at least two rows along a height direction, each power contact pair in each row has at least two pieces of power contacts, each power contact has a retaining portion held in the relative contact-receiving passageway, at least a contacting portion extending forwards from the retaining portion and at least a soldering portion bending from a rear end of the retaining portion. The power contact pairs are fixed in the insulative component in advance and then assembled into the insulating housing forwardly as a whole, the retaining portions of two power contacts in each power contact pair are arranged in the height direction, soldering portions of the power contacts are arranged in four rows along a front-and-back direction.

The present invention is also directed to an electrical connector assembly comprising an insulating housing extending in a longitudinal direction, a plurality of terminal groups and an insulative component. Each terminal group has at least two power contact pairs spaced apart from each other in a height direction, each power contact pair is consisted of at least two power contacts arranged in the height direction. The insulative component defines a first insulative piece and a second insulative piece both of which retaining a plurality of the power contact pairs. The first insulative piece and second insulative piece are stacked with each other along a height direction to form a contact module which can be assembled into the insulating housing.

The present invention is also directed to an electrical connector assembly comprising an insulating housing extending in a longitudinal direction, a plurality of terminal groups and an insulative component. Each terminal group includes at least two power contact pairs arranged in a height direction, each power contact pair is consisted of at least two power contacts arranged in the height direction. The insulative component defines a plurality of first insulative pieces and a plurality of second insulative pieces. Each first insulative piece engages with the corresponding second insulative piece horizontally to form a contact module with a terminal group retained inside, a plurality of the contact modules are arranged side by side in the longitudinal direction, the first insulative piece clamps one side of the two power contact pairs in advance while the second insulative piece clamps another side subsequently.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
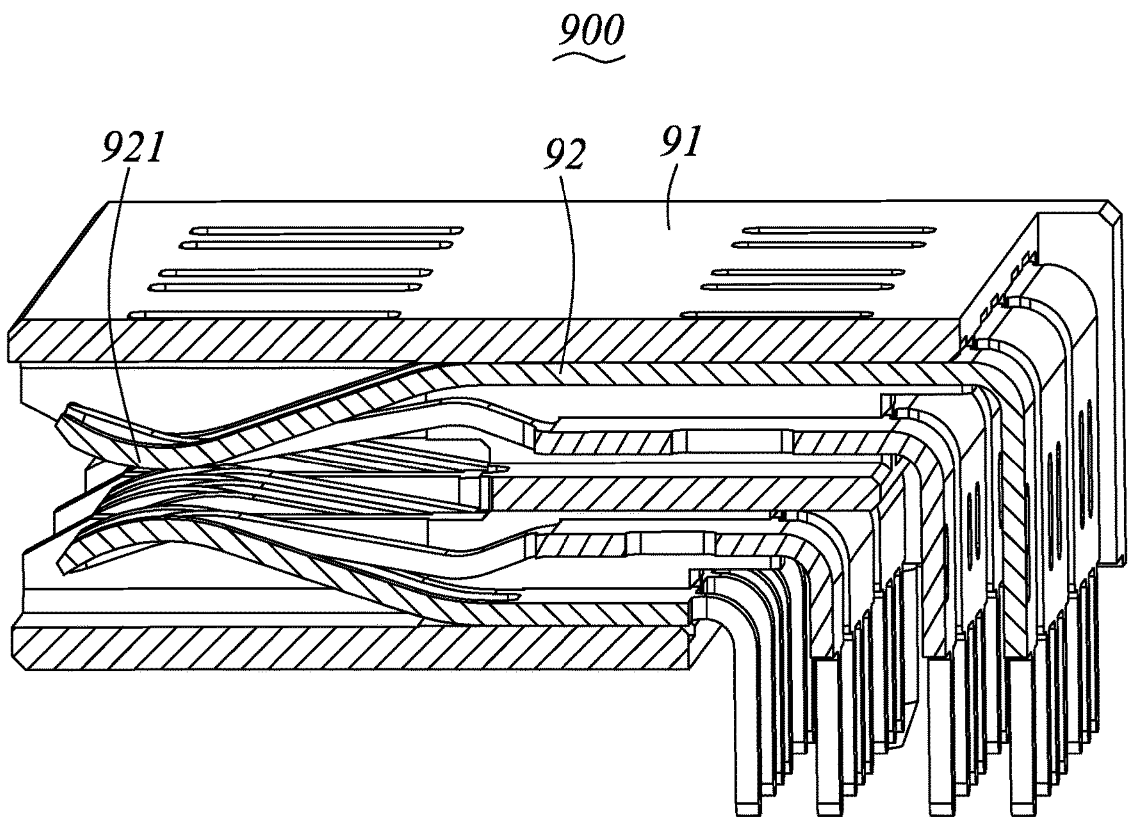
FIG. 1 (Prior Art)
FIG. 1 is a cross-sectional view of a prior art electrical connector.
Figure 2:
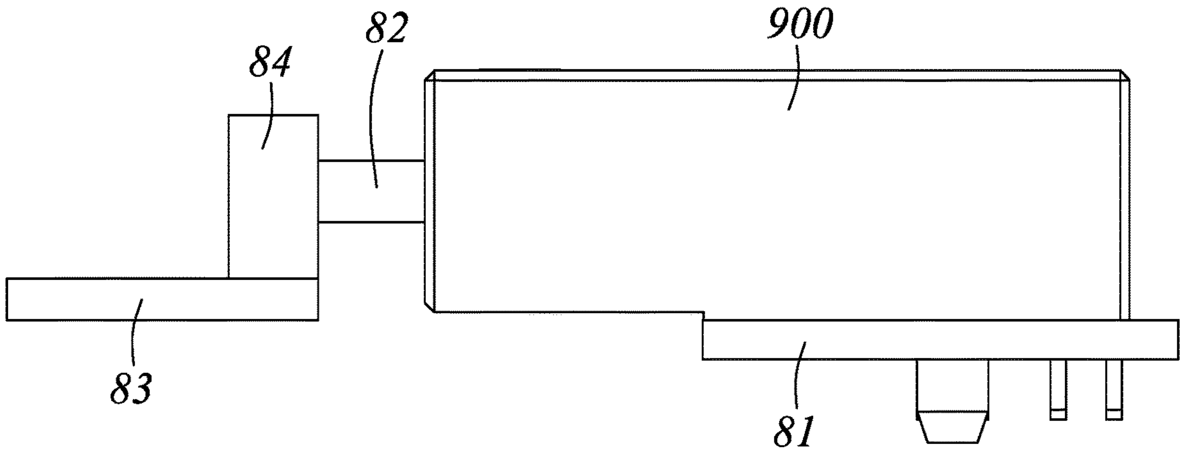
FIG. 2 (Prior Art)
FIG. 2 is a perspective view of the electrical connector shown in FIG. 1, and when the electrical connector is mounted on a PCB and mate with a mating member.

Reference will be made to the drawing figures to describe the present invention in detail, wherein depicted elements are not necessarily shown to scale and wherein like of similar elements are designated by same or similar reference numeral through the several views and same or similar terminology.

FIGS. 3-12 illustrate an electrical connector 100 according to a first embodiment of the present invention, and the electrical connector 100 comprises an insulating housing 1 and a plurality of power contact pairs 2 held in the insulating housing 1. In order to express convenience, hereinafter, a mating end of the electrical connector 100 is defined as a front end and another end opposite to the mating end is defined as a rear end, that is to say, a front-and-back direction (also can be called a longitudinal direction) is same as the plugging direction of the electrical connector 100 mating with a complementary member (not shown). At the same time, one direction perpendicular to the front-and-back direction is called as a transverse direction, and another direction perpendicular to the front-and-back direction is called as a height direction. In this case, the insulating housing 1 has a larger dimension in the transverse direction than in the height direction and the front-and-back direction.

As illustrated in FIGS. 3 to 5 and FIGS. 11-12, in this case, the insulating housing 1 has a mounting section 11 used for mounting on a printed circuit board (not shown), a mating section 12 extending forwardly from the mounting section 11, a plurality of contact-receiving passageways 13 extending along the front-and-back direction and a plurality of barriers 14 extending along the front-and-back direction. One barrier 14 is arranged between each two neighboring first contact-receiving passageways 13 in the transverse direction. Each first contact-receiving passageway 13 is penetrating through the insulating housing 1 along the front-and-back direction, and each barrier 14 extends forwards from the mounting section 11 to a front surface 121 of the mating section 12.

Figure 5:
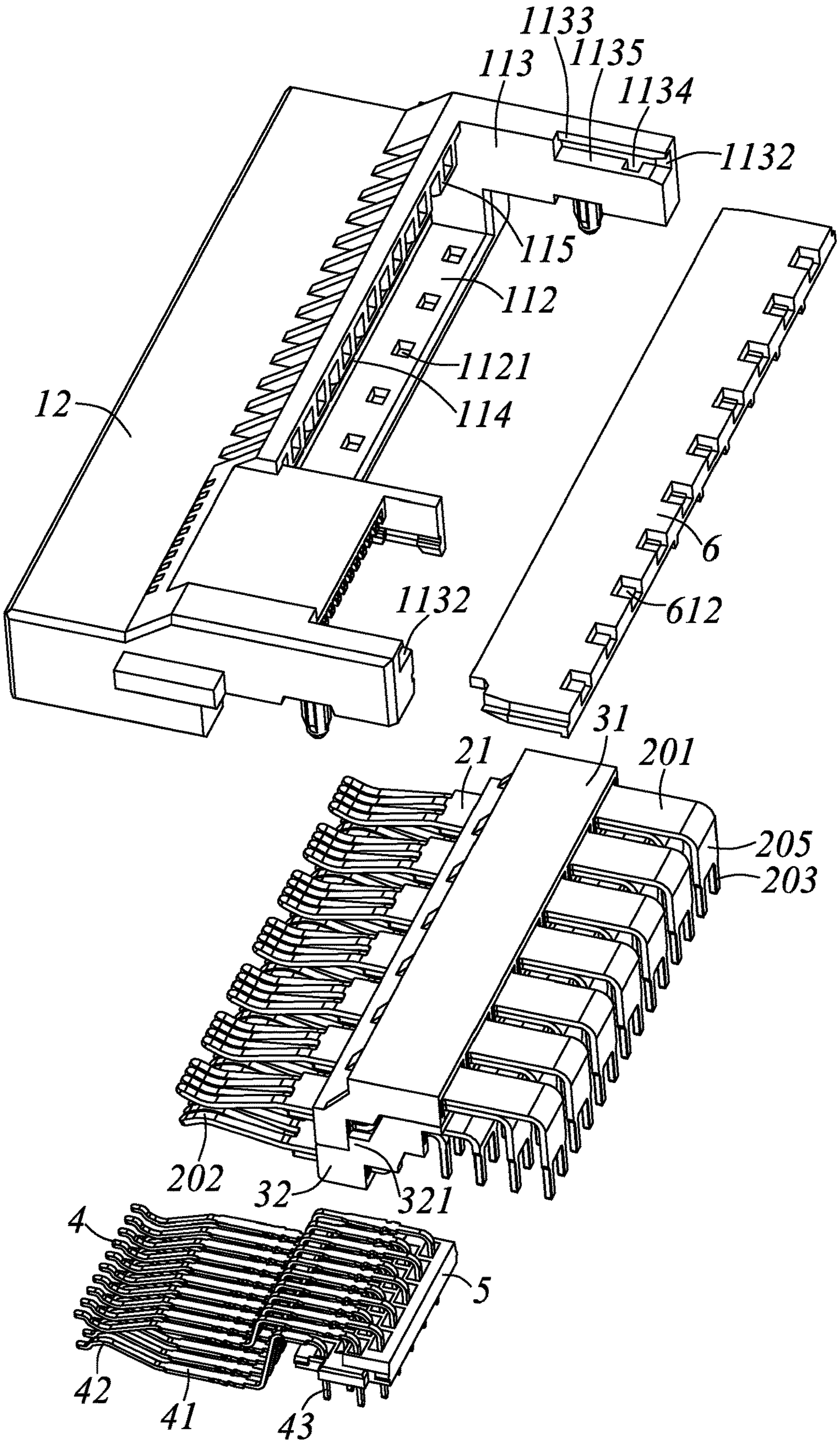
FIG. 5 is a partially exploded view of the electrical connector of FIG. 3.
Figure 6:
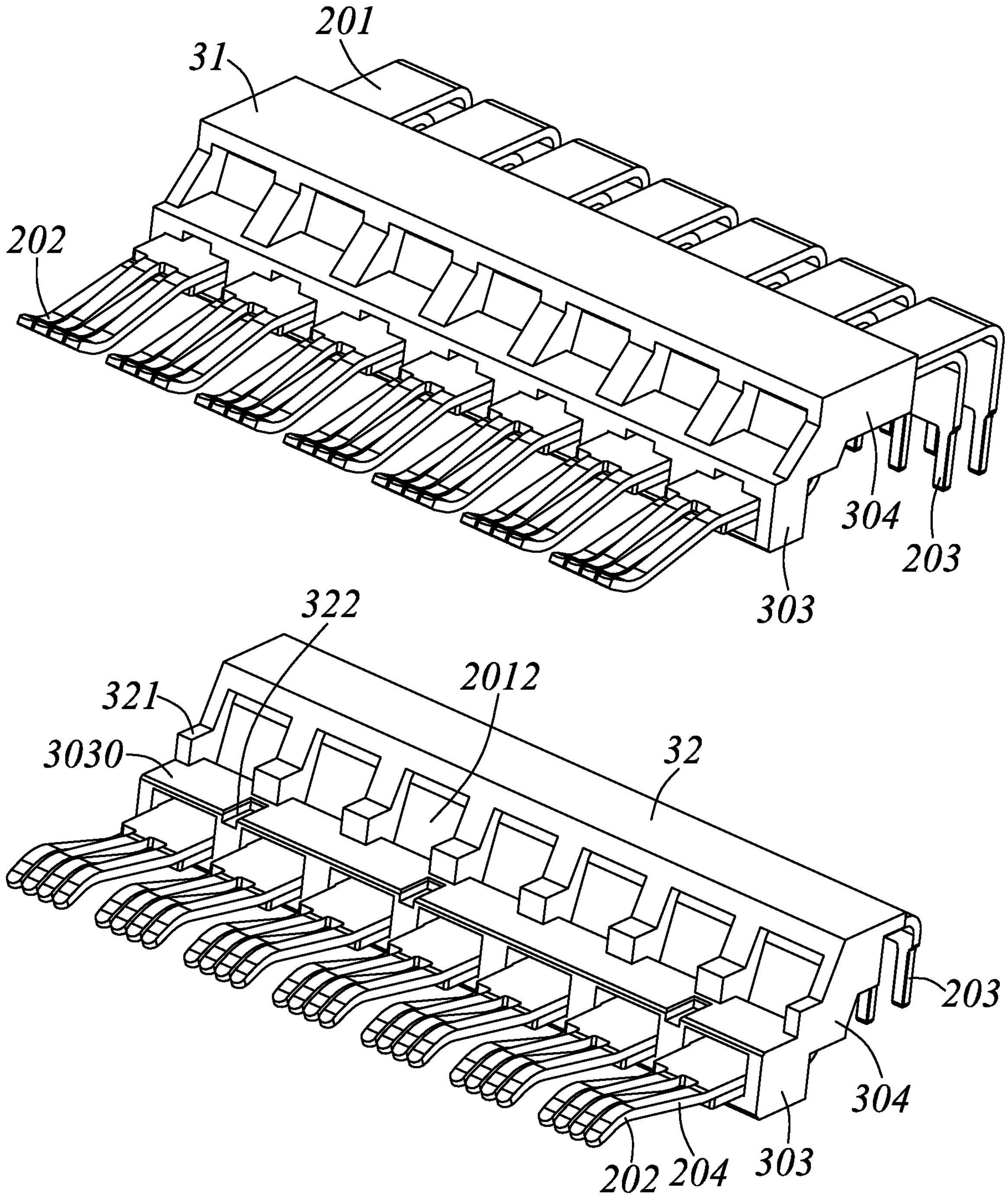
FIG. 6 is a partially exploded view of a contact module of the electrical connector shown in FIG. 5.
Figure 7:
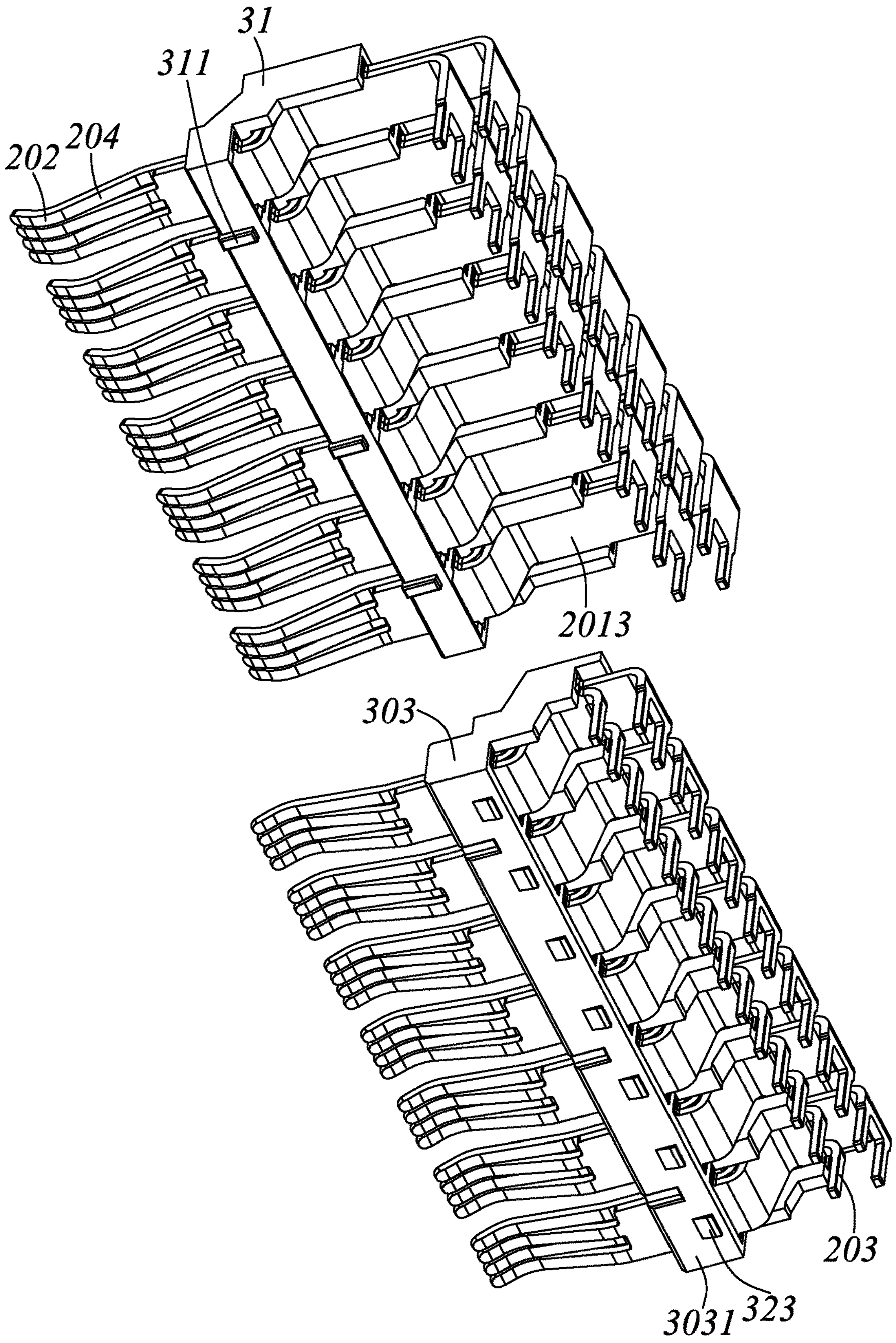
FIG. 7 is a view similar to FIG. 6, but viewed from another aspect.
Figure 8:
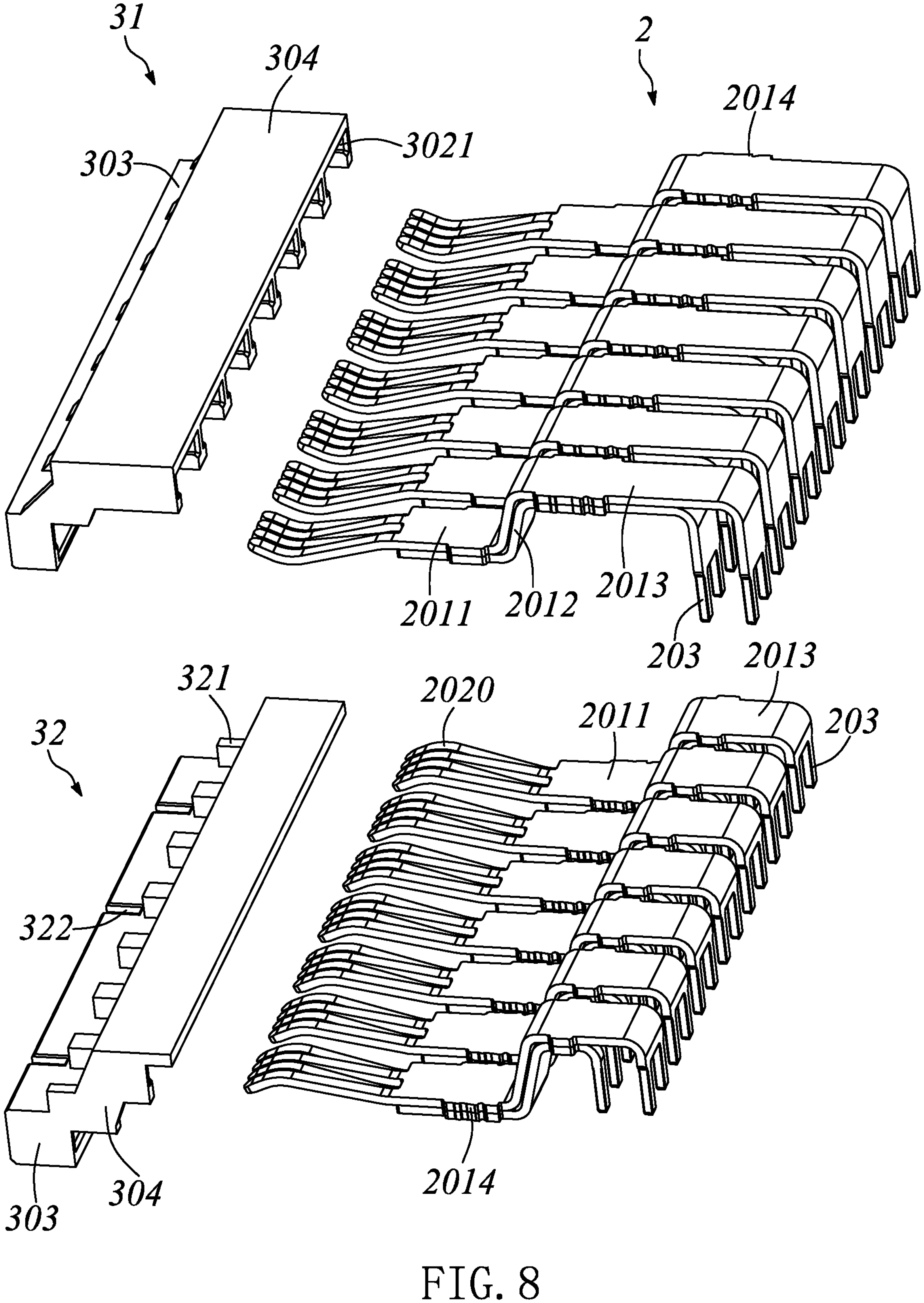
FIG. 8 is a further exploded view of the contact module shown in FIG. 6.
Figure 9:
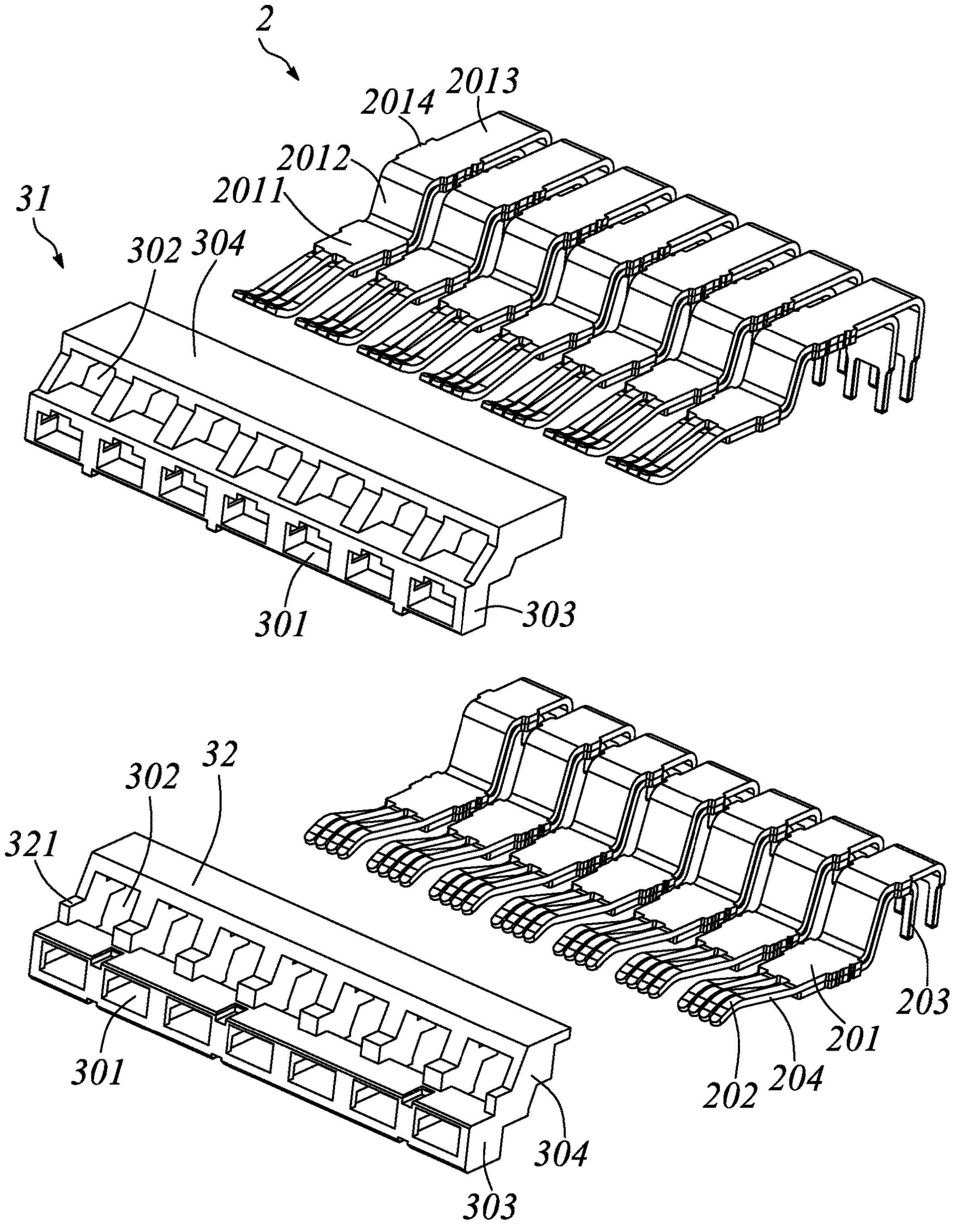
FIG. 9 is another view of the contact module of FIG. 8.
Figure 11:
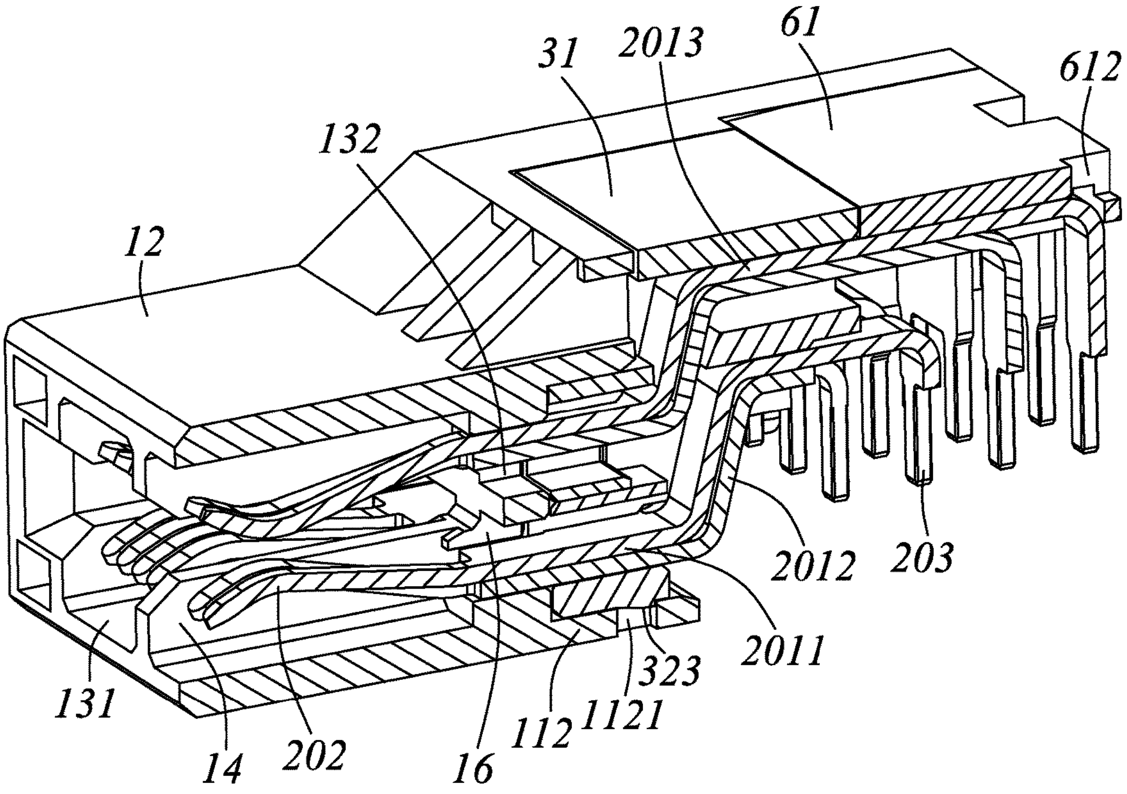
FIG. 11 and FIG. 12 are cross-sectional views of the electrical connector shown in FIG. 3 along line A-A.
Figure 12:
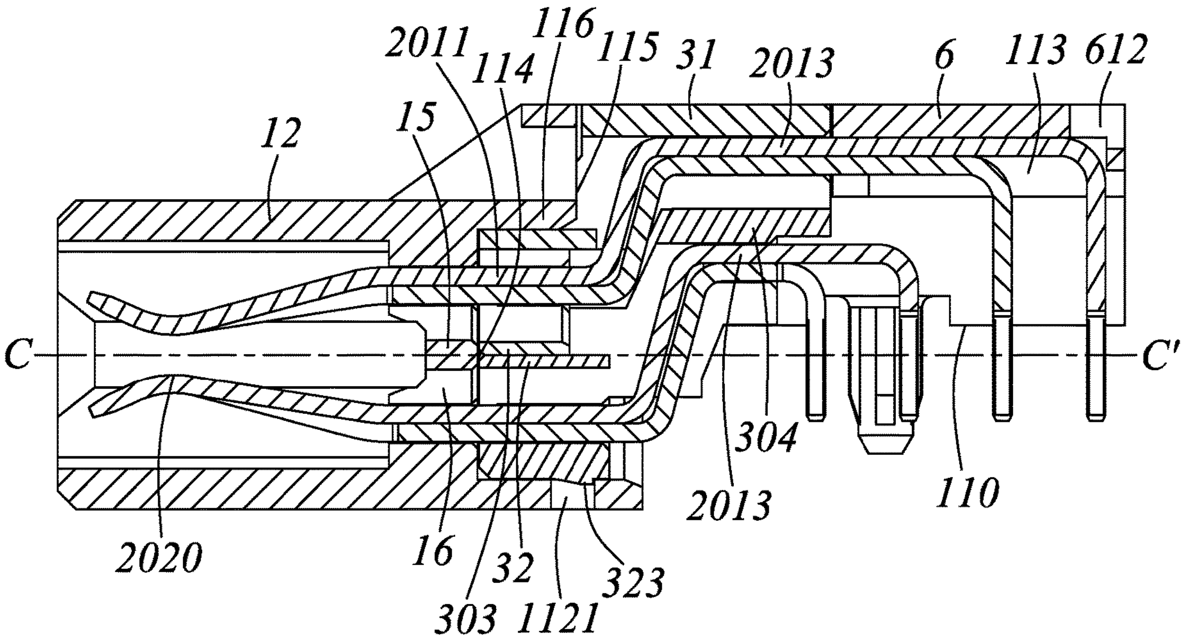
Figure 13:
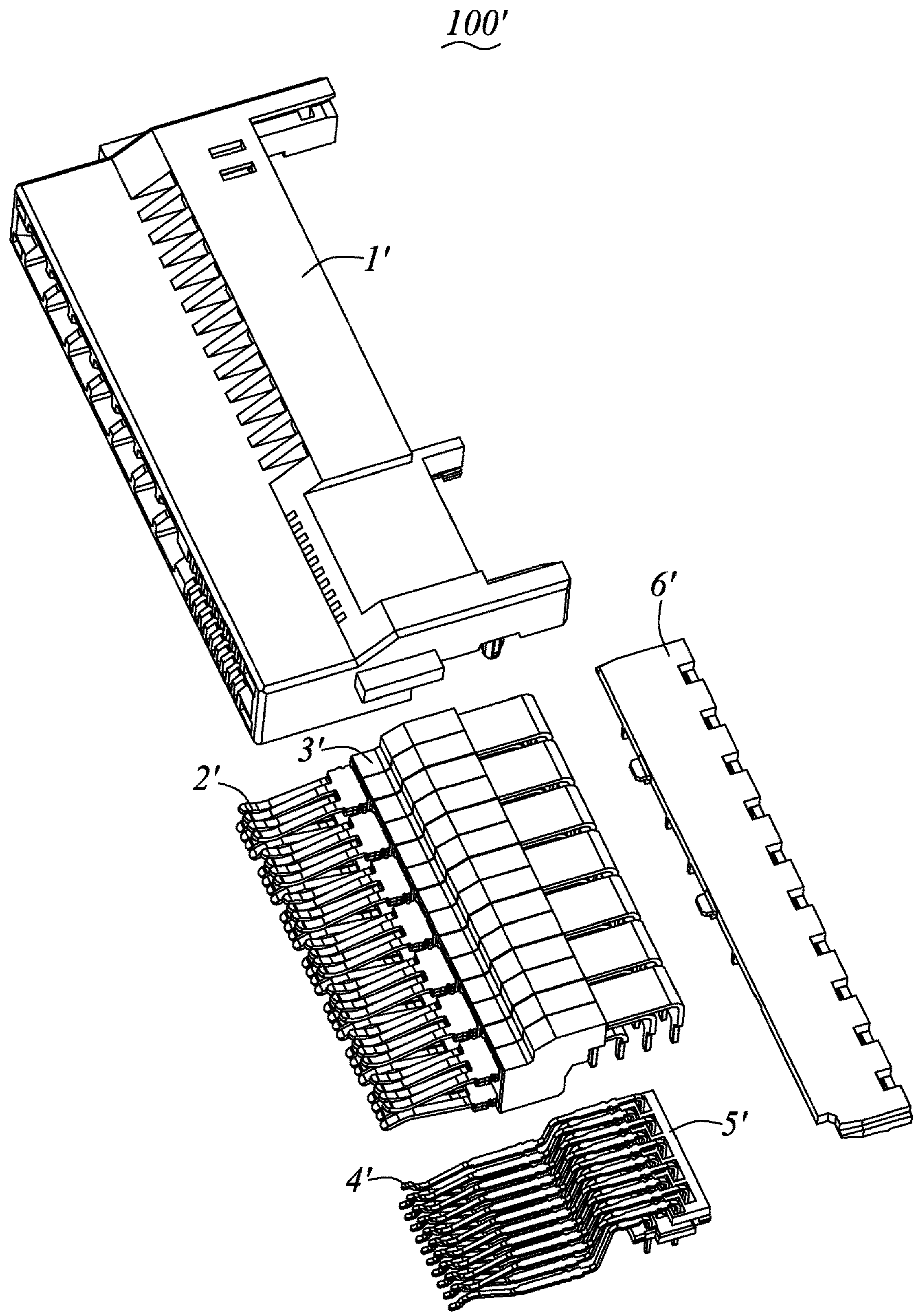
FIG. 13 is a partially exploded view of an electrical connector in a second embodiment of the present invention.
Figure 14:
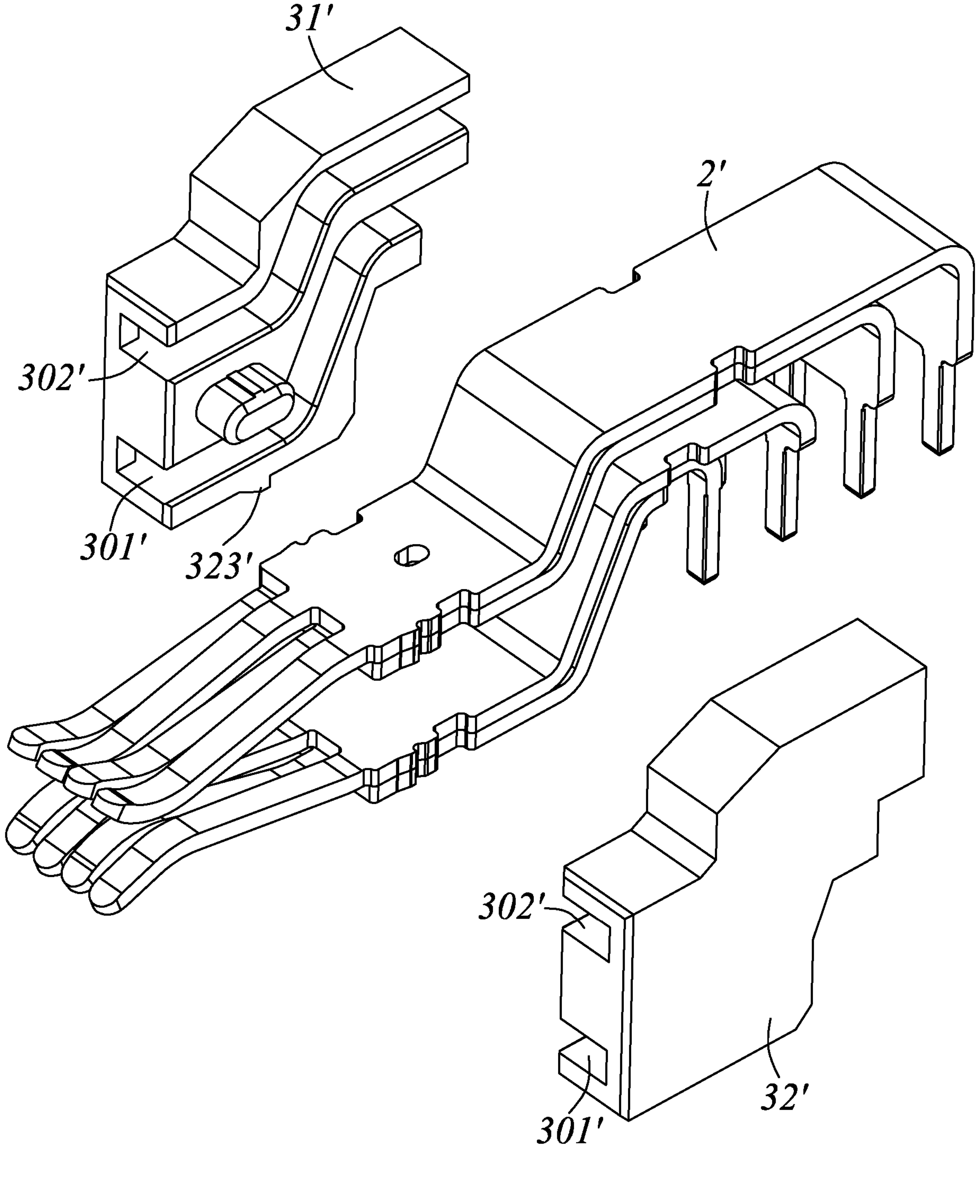
FIG. 14 is an exploded view of a contact module of the electrical connector shown in FIG. 13.
Figure 15:
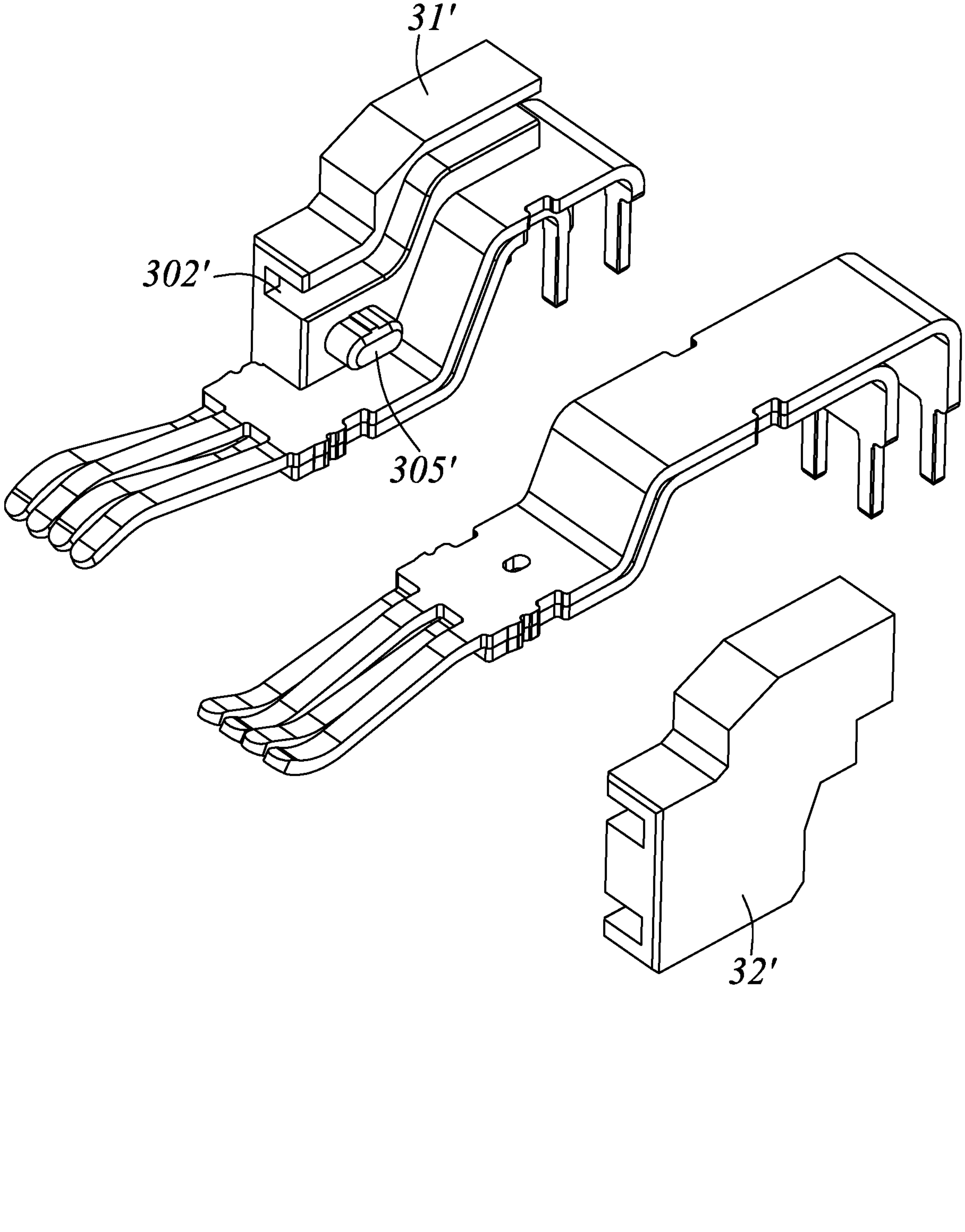
FIG. 15 is a partially assembled view of the contact module shown in FIG. 14.
Figure 16:
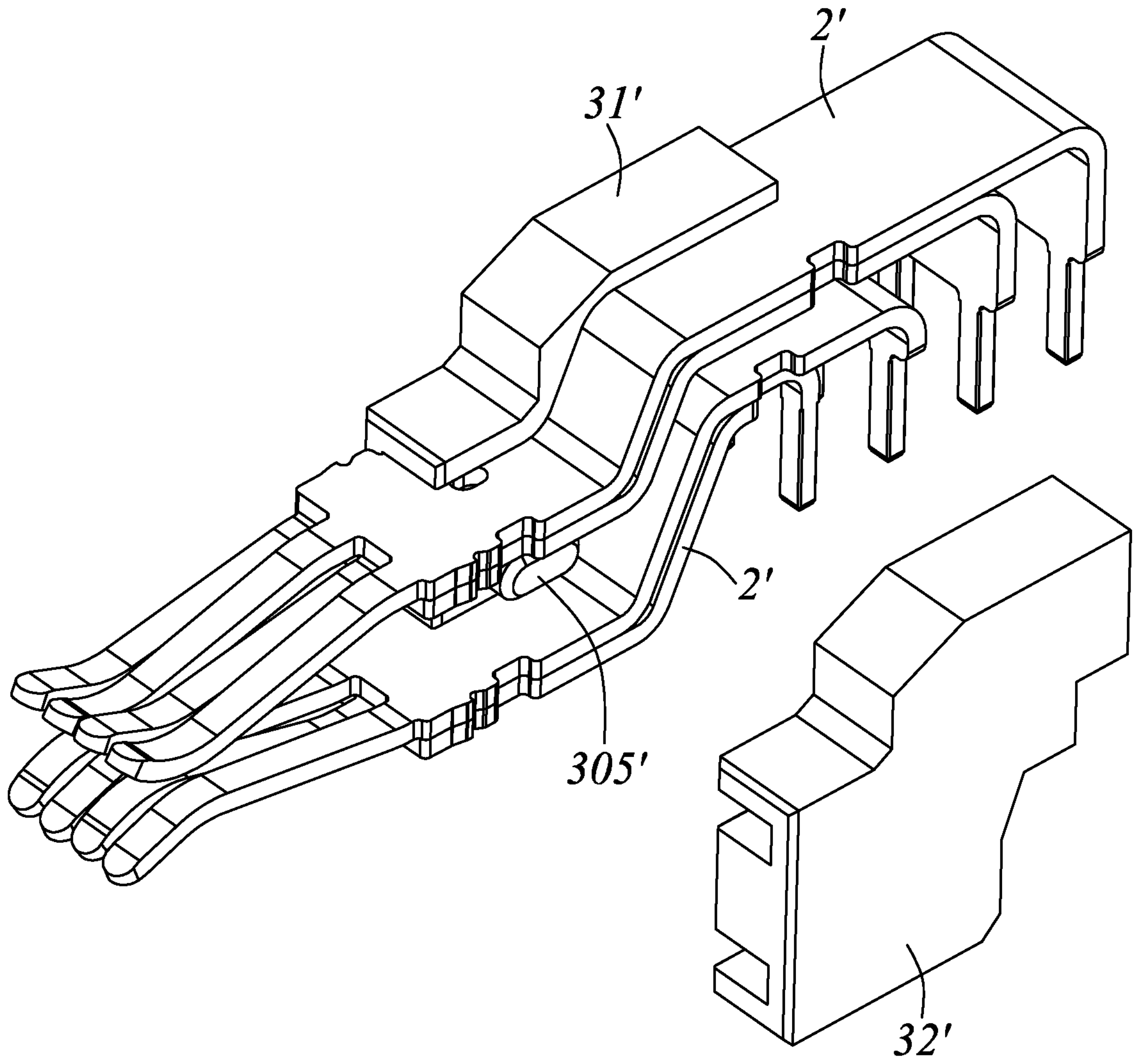
FIG. 16 is a further assembled view of the contact module of FIG. 15.
Figure 17:
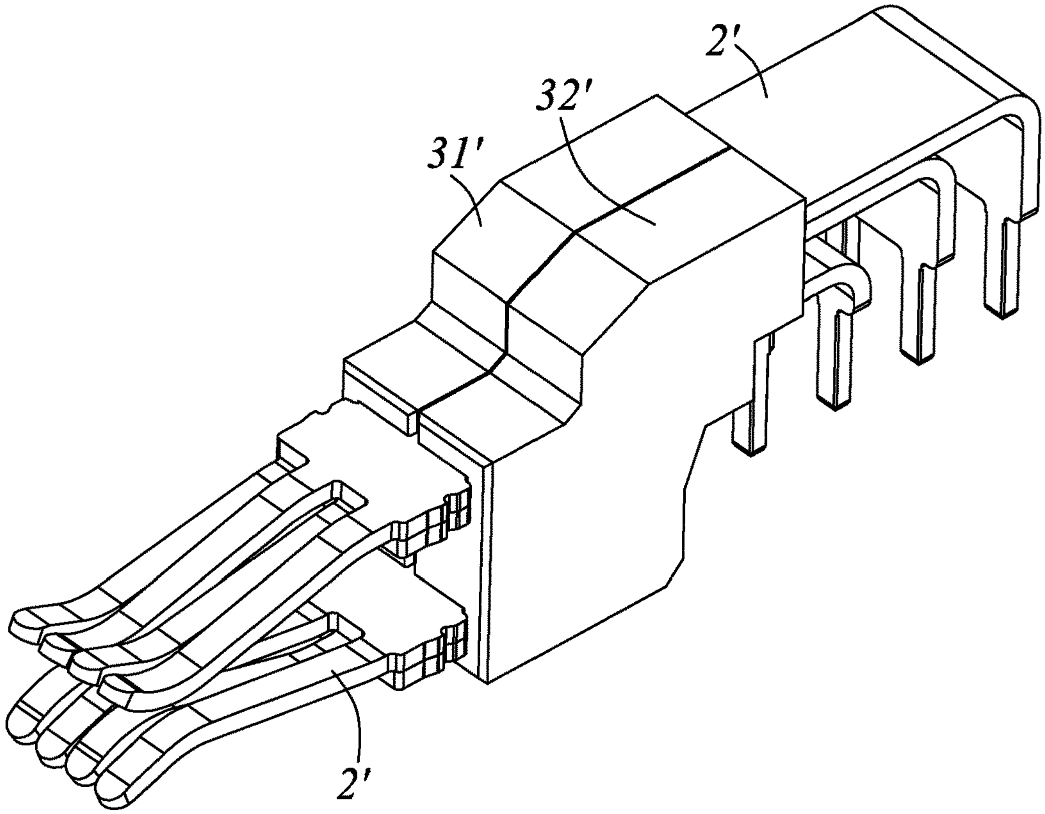
FIG. 17 is an assembled view of the contact module shown in FIG. 16.
Figure 18:
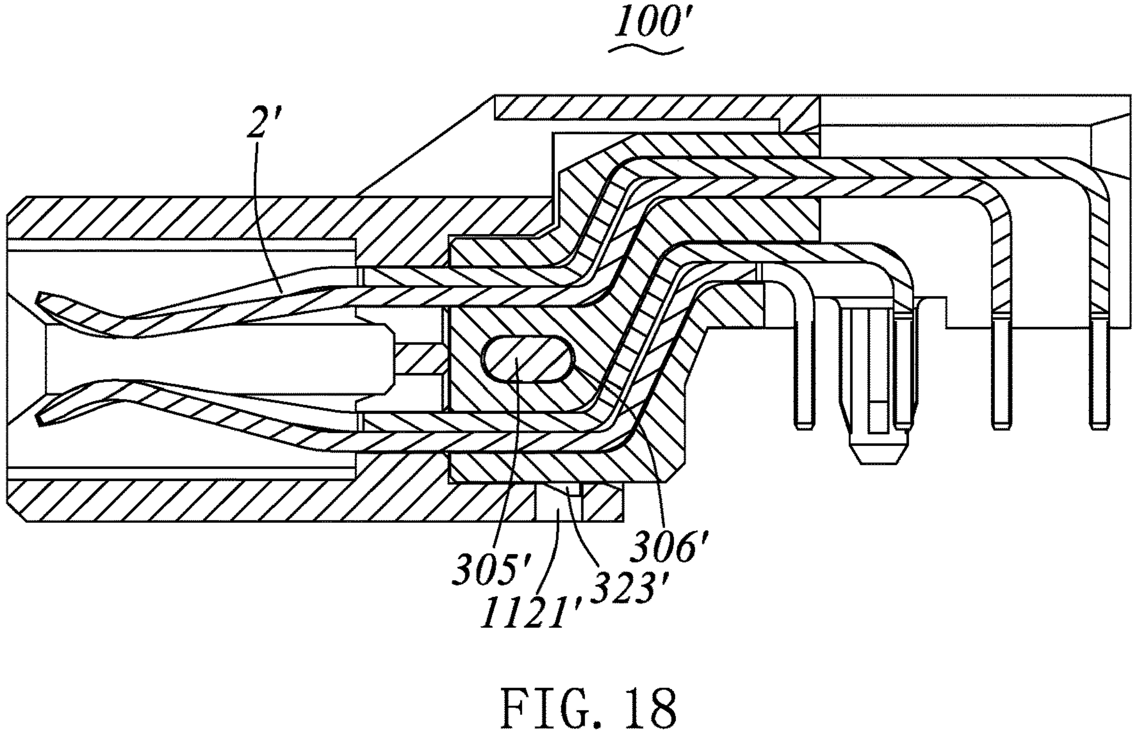
FIG. 18 is a cross-sectional view of the electrical connector after assembled shown in FIG. 13.

As referring to FIG. 5, FIG. 11 and FIG. 12, in the present invention, the mounting section 11 has a mounting surface 110 for mounting onto the printed circuit board. In the height direction, the mounting surface 110 is not lower than a horizontal center plane C-C' of the mating section 12.

Specifically, in the present embodiment, the mounting section 11 includes a supporting wall 112 located on a bottom thereof and a pair of extending portions 113 extending rearward to beyond the supporting wall 112, the mounting surface 110 is a bottom surface of the extending portions 113. The supporting wall 112 is plate-shaped and further defines a plurality of retaining holes 1121 which are formed on a top surface of the supporting wall 112. In further, in present embodiment, the retaining holes 1121 are arranged in a row along the transverse direction, and each retaining hole 1121 extends through the supporting wall 112 along the height direction.

Each extending portion 113 has a guiding slot 1132 which is depressed forwardly from a rear surface thereof, a recessed portion 1133 communicating with the guiding slot 1132 and a locking hole 1134 communicated with the guiding slot 1132. The recessed portion 1133 extends downwardly from a top surface of the extending portion 113 until it is communicated with the guiding slot 1132. In present embodiment, the recessed portion 1133 has a front surface coplanar with a front end surface of the guiding slot 1132. The locking hole 1134 is recessed downwards from a lower surface 1135 inside of the guiding slot 1132 and further extends downwardly to penetrate through the extending portion 113.

Additionally, the mounting section 11 defines a first mounting surface 114 and a second mounting surface 115 which are facing backwards, the first mounting surface 114 and a second mounting surface 115 are spaced apart from each other along the front-and-back direction. In the front-and-back direction, the first mounting surface 114 is located in front of the second mounting surface 115, the supporting wall 112 has a back end surface behind the second mounting surface 115.

The mating section 12 defines a mating cavity 120 opening forwards to receive the complementary member, and the contact-receiving passageways 13 are communicated with the mating cavity 120.

Figure 3:
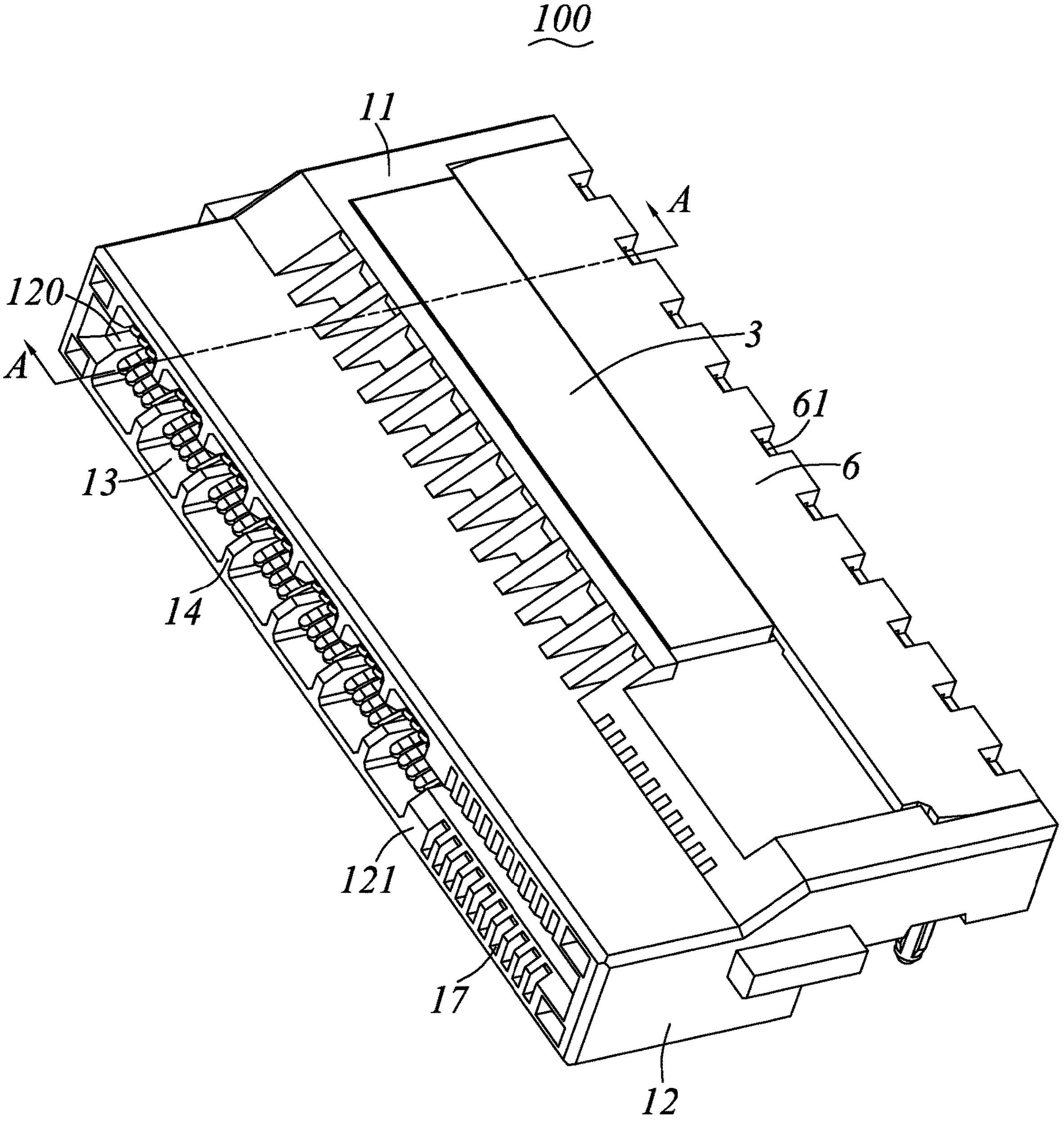
FIG. 3 is a perspective view of an electrical connector in a first embodiment of the present invention.

As referring to FIGS. 3, 11 and FIG. 12, in the present embodiment, each contact-receiving passageway 13 includes a first groove 131 and a second groove 132 communicated with each other. The first groove 131 is located in front of the second groove 132 to receive contacting portions 202 of corresponding power contact pair 2, the second groove 132 is behind the first groove 131 to receive and fix retaining portions 201 of corresponding power contact pair 2.

In this embodiment, the insulating housing 1 defines an upper row of contact-receiving passageways 13, a lower row of contact-receiving passageways 13 and an interval wall 15 between two rows of contact-receiving passageways 13. The interval wall 15 is extending along the transverse direction and formed in the mounting section 11, thus to separate the upper row of contact-receiving passageways 13 from the lower row of contact-receiving passageways 13. Further, the interval wall 15 extends forwards to the first mounting surface 114 of the mounting section 11, but does not extend forwards into the mating section 12.

Additionally, the insulating housing 1 further has a plurality of limitation portions 16 connecting with the interval wall 15, each limitation portion 16 protrudes upwardly or downwardly into the contact-receiving passageway 13 from the interval wall 15. In present invention, there are two rows of the limitation portions 16 which are respectively formed on an upper side and a lower side of the interval wall 15.

Referring to FIGS. 3-9 and conjunction with FIGS. 11-12, the power contact pairs 2 are received in the corresponding contact-receiving passageways 13, and divided into at least two rows along the height direction. Each power contact pair 2 in each row includes two flaky power contacts 21. Each power contact 21 has one retaining portion 201 held in the relative contact-receiving passageway 13, at least a pair of contacting portions 202 extending forwards from the retaining portion 201 and at least a soldering portion 203 bending from a rear end of the retaining portion 201.

Each retaining portion 201 is defined as a plate-shaped structure which is parallel to a horizontal plane. Each contacting portion 202 is formed with a curved shape and has a contacting area 2020 which protrudes towards the horizontal center plane C-C' of the mating section 12. Each soldering leg 203 is bended at a rear end of the retaining portion 201, the soldering legs 203 of the power contact pairs 2 in each row are divided into two groups in the front-and-back direction, and the soldering legs 203 in a same group are aligned in a line along the transverse direction.

In present embodiment, the power contact pairs 2 are arranged in pairs along the height direction to form a group, and two power contact pairs 2 in each group are opposite to each other in the height direction and arranged at intervals.

The contacting portions 202 of two power contacts 21 in each power contact pair 2 are lined up in a row in the height direction, and arranged alternately and cyclically. Of course, the contacting portions 202 of two power contacts 21 in each power contact pairs 2 also can be misaligned along the height direction. As long as the contacting portions 202 of two power contacts 21 in each power contact pairs 2 are located on a same horizontal plane when the electrical connector 100 mating with the complementary member.

Each retaining portion 201 comprises a first horizontal part 2011 extending horizontally, an inclined part 2012 extending and bending rearwardly from a rear end of the first horizontal part 2011, and a second horizontal part 2013 extending and bending rearwardly from a top end of the inclined part 2012. In this invention, the first horizontal part 2011 also can be named as a plate part, the second horizontal part 2013 also can be named as an extended part. The length of each second horizontal part 2013 in an upper row of power contact pairs 2 is longer than that of the first horizontal part 2011 of the relative power contact 21.

Moreover, each retaining portion 201 further includes a plurality of interferential portions 2014 which protrudes from two lateral edges of the first horizontal part 2011 or second horizontal part 2013. In present embodiment, the interferential portions 2014 in the upper row of the power contact pairs 2 are located on an outer side of the second horizontal part 2013, and the interferential portion 2014 in a lower row of the power contact pairs 2 is located on an outer side of the first horizontal part 2011.

In each power contact pair 2, the first horizontal parts 2011 of the two power contacts 21 are stacked with each other along the height direction, the second horizontal parts 2013 of the two power contacts 21 are also stacked along the height direction, there is a small gap between the inclined parts 2012 of the two power contacts 21. In other embodiments, the first horizontal parts 2011 of the two power contacts 21 in each pair can be spaced apart from each other with a certain distance in the height direction, and the second horizontal parts 2013 of the two power contacts 21 in each pair can also be spaced apart from each other with a certain distance in the height direction. Besides, the first horizontal parts 2011 of the two power contacts 21 in each power contact pair 2 are forwardly assembled into a same contact-receiving passageway 13 from a back side of the mounting section 11.

Moreover, each power contact 21 has a plurality of elastic contacting arms 204 extending forwards from a front end of the retaining portion 201, each contacting portion 202 is located in front of the relative contacting arm 204 for mating with the complementary member. The contacting arms 204 are passing forwards through the second groove 132 of the relative contact-receiving passageways 13 and received in the first groove 131.

In present embodiment, each power contact 21 has two contacting portions 202 extending forwardly from the retaining portion 201. In other embodiments of present invention, each power contact 21 also can have three or more contacting portions 202.

As illustrated in FIG. 12, in an up-to-down direction, the lengths of the second horizontal parts 2013 of four power contacts 21 in each group of power contact pairs 2 in the front-and-back direction are decreased successively, thereby the soldering legs 203 of the four power contacts 21 can be arranged in four rows along the front-and-back direction. The soldering leg 203 of the lowest power contact 21 is located on a frontmost side of the four rows while the soldering leg 203 of the uppermost power contact 21 is located on a rearmost side.

Each power contact 21 has a plate-shaped portion 205 which is bended from a rear end of the retaining portion 201 and extends downwardly. The plate-shaped portion 205 is parallel to a vertical plane. The soldering leg 203 extends downwardly from a bottom end of the plate-shaped portion 205 to connect with the printed circuit board vertically.

As referring to FIG. 3 to FIG. 9, and in view of FIG. 11 and FIG. 12, the electrical connector 100 further comprises an insulative component 3 which is retained outside of the plurality of power contact pairs 2, the power contact pairs 2 are retained with the insulative component 3 in advance and then assembled into the insulating housing 1 as a whole. The power contact pairs 2 are bended to form the soldering legs 203 in advance and then retained in the insulative component 3. Specifically, the power contact pairs 2 can be retained in the insulative component 3 by embedding or assembling, the insulative component 3 can be a unitary structure or an assembled structure with several bodies. The insulating housing 1 further has a limiting wall 116 which is jointly with the supporting wall 112 to limit the insulative component 3 in the height direction.

In present embodiment, the insulative component 3 defines a first insulative piece 31 and a second insulative piece 32 assembled with each other, two rows of the power contact pairs 2 are fixed in the first insulative piece 31 and second insulative piece 32 respectively in order to form a contact module which then assembled into the insulating housing 1.

Furtherly, in present embodiment, two rows of the power contact pairs 2 are forwardly assembled into the first insulative piece 31 and second insulative piece 32 respectively. In other embodiments of present invention, the two rows also can be embedded in the first insulative piece 31 and second insulative piece 32 in advance, and then assembled into the insulating housing 1.

Each one of the first insulative piece 31 and second insulative piece 32 has a plurality of first retaining slots 301 and a plurality of second retaining slots 302 extend through the first insulative piece 31 and the second insulative piece 32 forwardly, the first retaining slots 301 and the second retaining slots 302 are separated from each other along the height direction.

In the height direction, the second retaining slots 302 of the first insulative piece 31 are located on an upper side of the first retaining slots 301 thereof. The second retaining slots 302 of the second insulative piece 32 are located on an upper side of the first retaining slots 301 thereof.

Specifically, in present embodiment, the first insulative piece 31 and second insulative piece 32 are engaged along the height direction. The power contact pairs 2 in one row are assembled into the first insulative piece 31 to form a first contact module, while the power contact pairs 2 in another row are assembled into the second insulative piece 32 to form a second contact module.

The plurality of the first retaining slots 301 of the first insulative piece 31 are arranged side by side along the transverse direction, the second retaining slots 302 of the first insulative piece 31 are arranged side by side along the transverse direction. The plurality of the first retaining slots 301 of the second insulative piece 32 are arranged side by side along the transverse direction, the second retaining slots 302 of the second insulative piece 32 are arranged side by side along the transverse direction. The first horizontal part 2011 is retained in the first retaining slot 301 while the second horizontal part 2013 retained in the second retaining slot 302.

Additionally, in present embodiment, in the front-and-back direction, the second retaining slots 302 of the second insulative piece 32 are located behind the first retaining slots 301.

In present embodiment, the first insulative piece 31 is assembled on the second insulative piece 32, each one of the first insulative piece 31 and the second insulative piece 32 defines a base body 303 and a protrusion body 304 extending rearwardly from the base body 303. The first retaining slots 301 extend through the base body 303 in the front-and-back direction, the second retaining slots 302 extend through the protrusion body 304 in the front-and-back direction.

The first insulative piece 31 further includes at least one engaging portion 311 which protrudes downwardly from a bottom surface thereof. The second insulative piece 32 further has a plurality of stoppers 321 protruding upwardly from a top surface 3030 of the base body 303, at least one engaging slot 322 depressed downwardly from the top surface 3030 of the base body 303, and a plurality of retaining protrusions 323 protruding downwardly from a bottom surface 3031 of the base body 303.

After two rows of the power contact pairs 2 assembled into the first insulative piece 31 and the second insulative piece 32 respectively, the first insulative piece 31 and the second insulative piece 32 are engaged with each other in the height direction, and the stoppers 321 of the second insulative piece 32 are resisting against a backside of the base body 303 of the first insulative piece 31. The engaging portion 311 of the first insulative piece 31 are retained in the engaging slot 322 of the second insulative piece 32.

After the first insulative piece 31 and the second insulative piece 32 assembled into the insulating housing 1, the second insulative piece 32 is supported by the supporting wall 112, the retaining protrusions 323 are retained in the retaining holes 1121 of the insulating housing 1.

Figure 4:
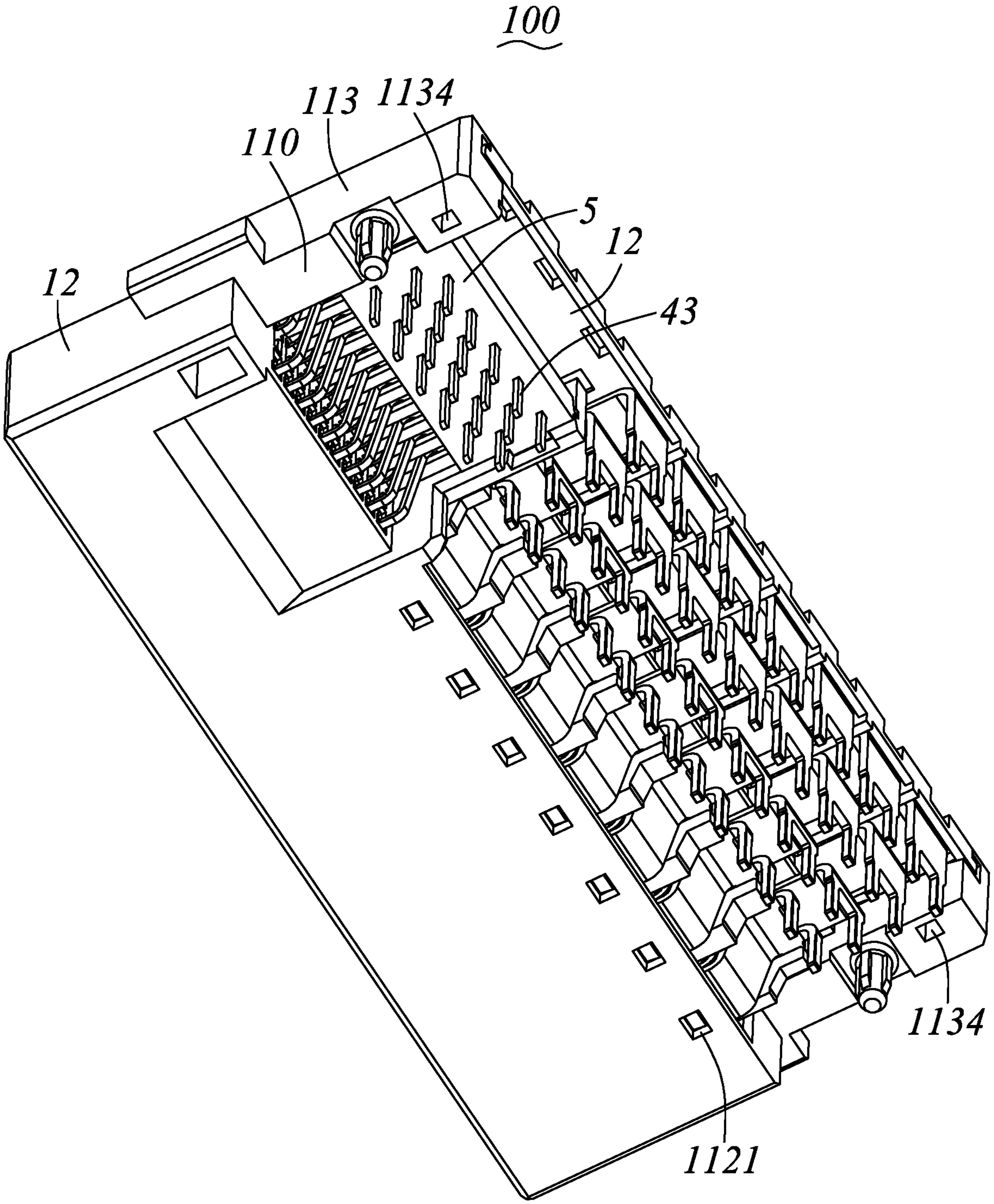
FIG. 4 is a view similar to FIG. 3, but viewed from another aspect.

As referring to FIG. 3 to FIG. 5, in present embodiment, the electrical connector 100 further has a plurality of signal contacts 4 which are located on one side of the power contact pairs 2 in the transverse direction. The insulating housing 1 further defines a plurality of receiving channels 17 on one side of the contact-receiving passageway 13 for receiving the signal contacts 4. Each signal contact 4 comprises a positioning portion 41, a mating arm 42 extending from one end of the positioning portion 41 and a tail 43 extending from the other end of the positioning portion 41.

The positioning portion 41 is inserted into the receiving channel 17 from a rear side of the mounting section 11 and fixed in the receiving channel 17, and the mating arm 42 in front of the positioning portion 41 is protruding into the mating section 12 to make an electrical connection with the complementary member. In this embodiment, a plurality of barbs 411 are formed on two lateral sides of the positioning portion 41, the barbs 411 are engaging with the mounting section 11 to retain the signal contact 4 in the insulating housing 1 firmly, thereby preventing the signal contact 4 from shaking and improving stability of the connection.

Additionally, the electrical connector 100 further comprises a spacer 5 which is assembled with the insulating housing 1 to retain the tails 43 of the signal contacts 4.

Figure 10:
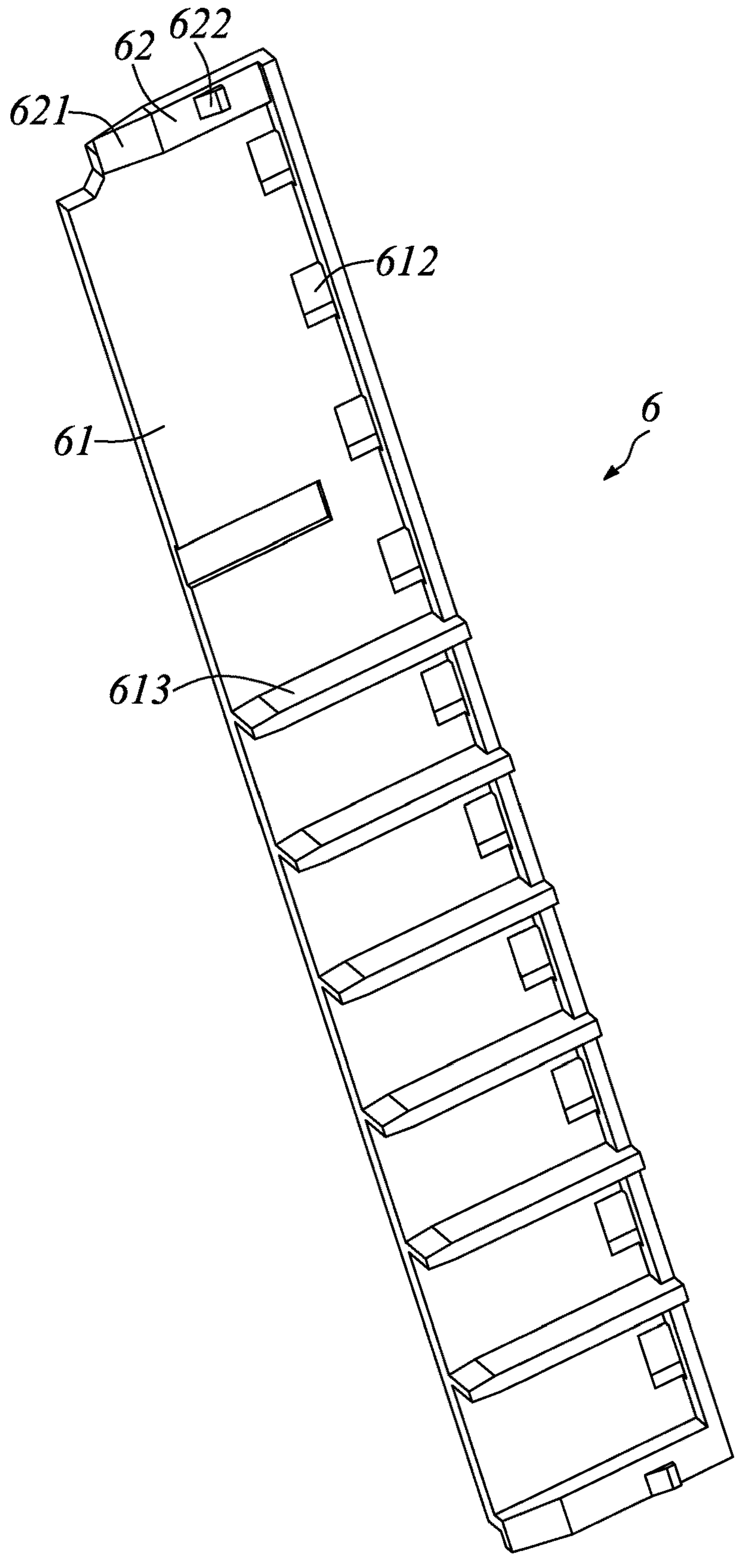
FIG. 10 is a perspective view of a cover of the electrical connector shown in FIG. 5.

As shown in FIG. 3 to FIG. 5 and in view of FIG. 10 to FIG. 12, the electrical connector 100 further has a cover 6 engaged with the mounting section 11, the cover 6 is plate-shaped and extends in the transverse direction to form a strip shape. The cover 6 is assembled into the guiding slots 1132 of the extending portions 113 along a back-to-front direction.

In this embodiment, the cover 6 has a main plate 61 and a pair of insertion portions 62 formed on opposite sides of the main plate 61 in the transverse direction. The main plate 61 has a plurality of openings 612 extending through the main plate 61 along the height direction and a plurality of separating ribs 613 protruding from a bottom surface of the main plate 61. The openings 612 are located on a rear segment of the main plate 61 and arranged in a row in the transverse direction. Each separating rib 613 extends along the front-and-back direction, further extends to a rear surface of the main plate 61 from a front surface of the main plate 61 to separate two neighboring power contact pairs 2 in the transverse direction.

Each insertion portion 62 has a tip end portion 621 in the front thereof and a locking portion 622 formed on a bottom surface thereof. The tip end portion 621 is sharp to make the insertion portion 62 insert into the guiding slot 1132 smoothly.

After the contact module assembled into the insulating housing 1, the cover 6 is assembled forwardly to a rear segment of the insulating housing 1. The insertion portions 62 are inserted into the corresponding guiding slots 1132 forwardly until the locking portion 622 is locked in the locking hole 1134, thereby the cover 6 is retained on a top side of the rear segment of the insulating housing 1. There is one separating rib 613 located between every two neighboring power contact pairs 2 in the transverse direction. The main plate 61 covers a rear part of the second horizontal part 2013 from an upper side of the second horizontal part 2013 of the uppermost power contact 21. A conjunction area between the second horizontal part 2013 and the plate-shaped portion 205 of the uppermost power contact 21 is exposed in the corresponding opening 612.

FIGS. 13 to 18 illustrate an electrical connector 100' in a second embodiment of the present invention, and the electrical connector 100' includes an insulating housing 1', a plurality of power contact pairs 2' retained in the insulating housing 1', an insulative component 3', a plurality of signal contacts 4', a spacer 5' and a cover 6'. Herein, the insulating housing 1', the power contact pairs 2', the signal contacts 4', the spacer 5' and the cover 6' are similar or same as that of the first embodiment, so the description for them is omitted here for the second embodiment. The difference between the two embodiments is explained as follows.

In present second embodiment, the insulative component 3' includes a plurality of first insulative pieces 31' and a plurality of second insulative pieces 32', the first insulative pieces 31' and the second insulative pieces 32' are arranged in pairs. In each pair, the first insulative piece 31' and second insulative piece 32' are opposite to each other and engaged with each other along a transverse direction to hold a group of power contact pairs 2', thereby forming a contact module. A plurality of the contact modules in present second embodiment are arranged abreast in the transverse direction and assembled into the insulating housing F.

Same as the first embodiment, each one of the first insulative piece 31' and second insulative piece 32' has a first retaining slot 301' and a second retaining slot 302' spaced apart from each other along a height direction. Comparing to the first embodiment, the first retaining slots 301' of the first insulative piece 31' and the second insulative piece 32' in the second embodiment are opposite to each other, and the second retaining slots 302' of the first insulative piece 31' and second insulative piece 32' are also opposite to each other. After the first insulative piece 31' engaged with the second insulative piece 32', the first retaining slot 301' of the first insulative piece 31' is communicated with the first retaining slot 301' of the second insulative piece 32' to receive one power contact pair 2'. The second retaining slot 302' of the first insulative piece 31' is communicated with the second retaining slot 302' of the second insulative piece 32' to receive another one power contact pair 2'.

The two power contact pairs 2' in each group are retained in the first retaining slot 301' and the second retaining slot 302' respectively. Specifically, in present second embodiment, an upper power contact pair 2' in each group are retained in the first retaining slots 301' of the first and second insulative piece 31', 32', while a lower power contact pair 2' in each group are retained in the second retaining slots 302' of the first and second insulative piece 31', 32'.

Additionally, take the first insulative piece 31' and second insulative piece 32' arranged in one pair as an example, one of the first insulative piece 31' and second insulative piece 32' has a protruding portion 305' protruding towards the other one, while the other one of the first insulative piece 31' and second insulative piece 32' has a receiving slot 306' for receiving the protruding portion 305'. At least one of the first insulative piece 31' and second insulative piece 32' has a retaining protrusion 323' protruding from a bottom surface thereof which can be retained in a retaining hole 1121' of the insulating housing F.

As shown in FIG. 14 to FIG. 17, showing an assembling process of the first and second insulative piece 31', 32' and one group of power contact pairs 2'. The lower power contact pair 2' in the group is assembled into the first retaining slot 301' of the first insulative piece 31' firstly, and then the upper power contact pair 2' is assembled into the second retaining slot 302' of the first insulative piece 31', and then the second insulative piece 32' is assembled along the transverse direction from one lateral side of the first insulative piece 31'.

Figure 19:
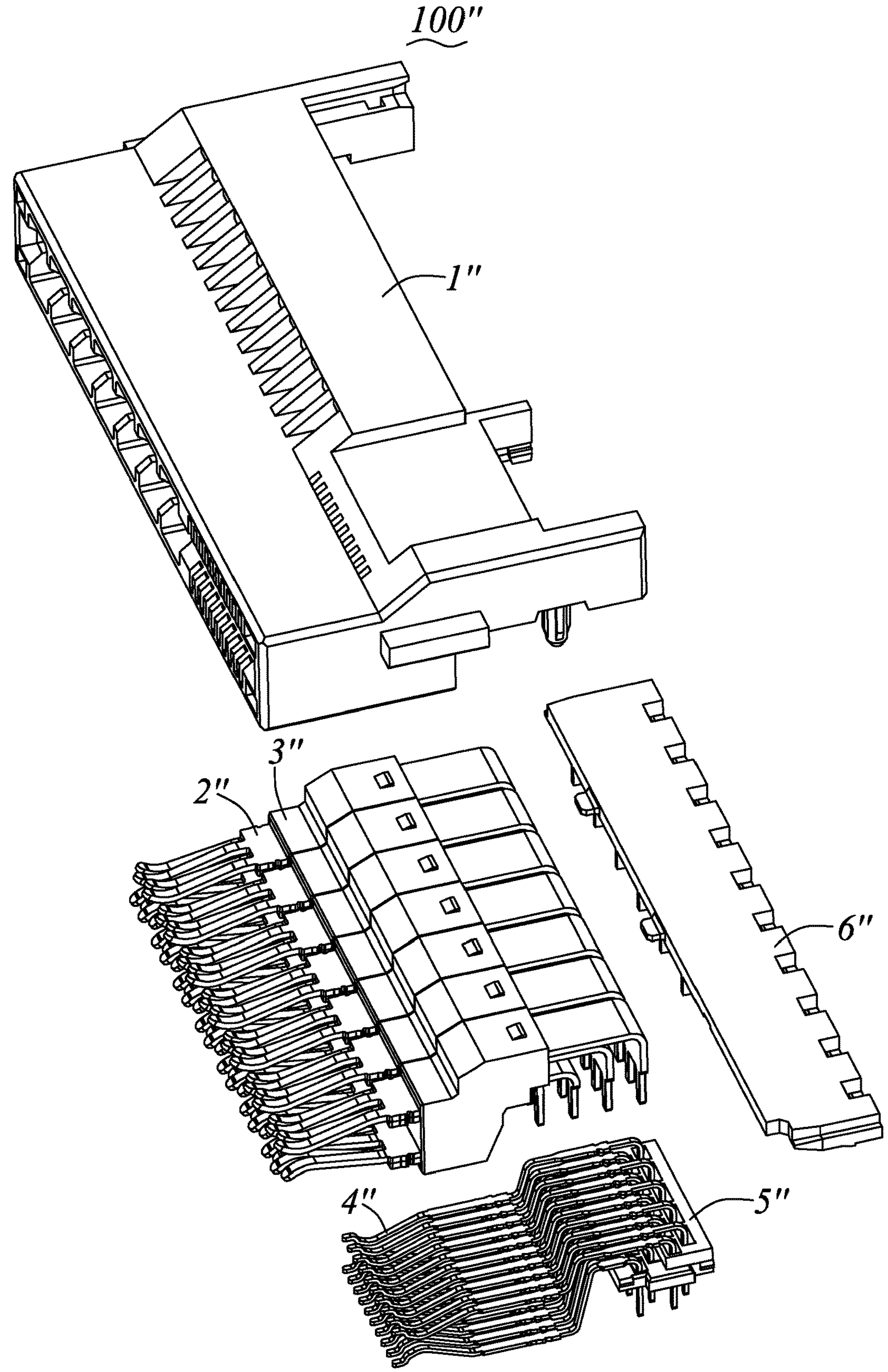
FIG. 19 is a partially exploded view of an electrical connector in a third embodiment of the present invention.
Figure 20:
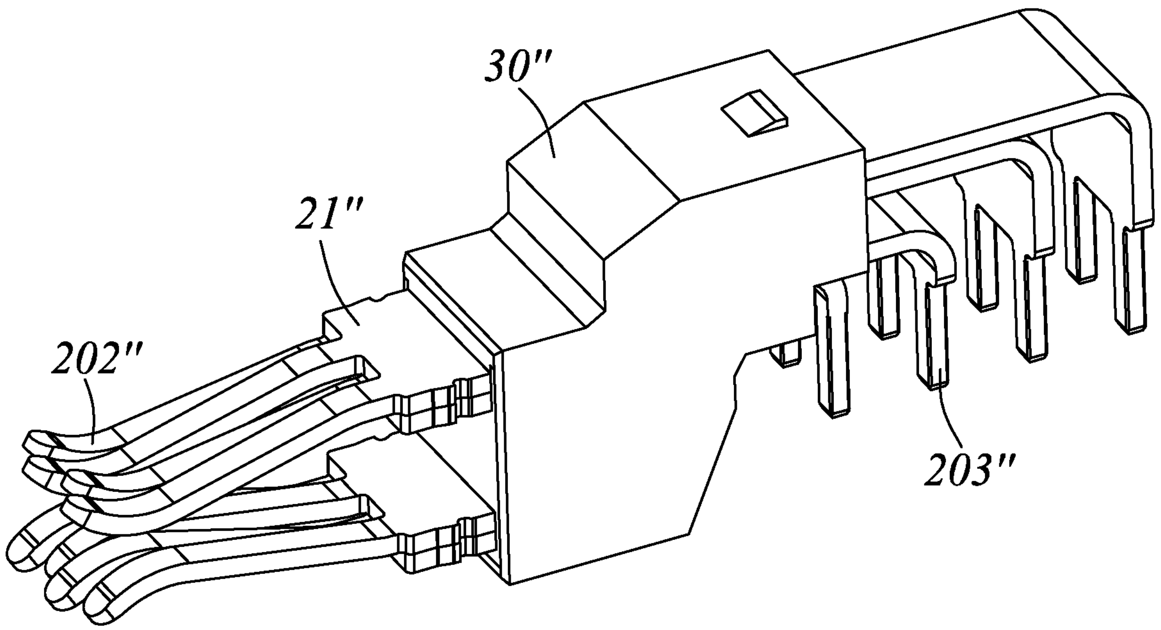
FIG. 20 is an assembled view of a contact module of the electrical connector of FIG. 19.
Figure 21:
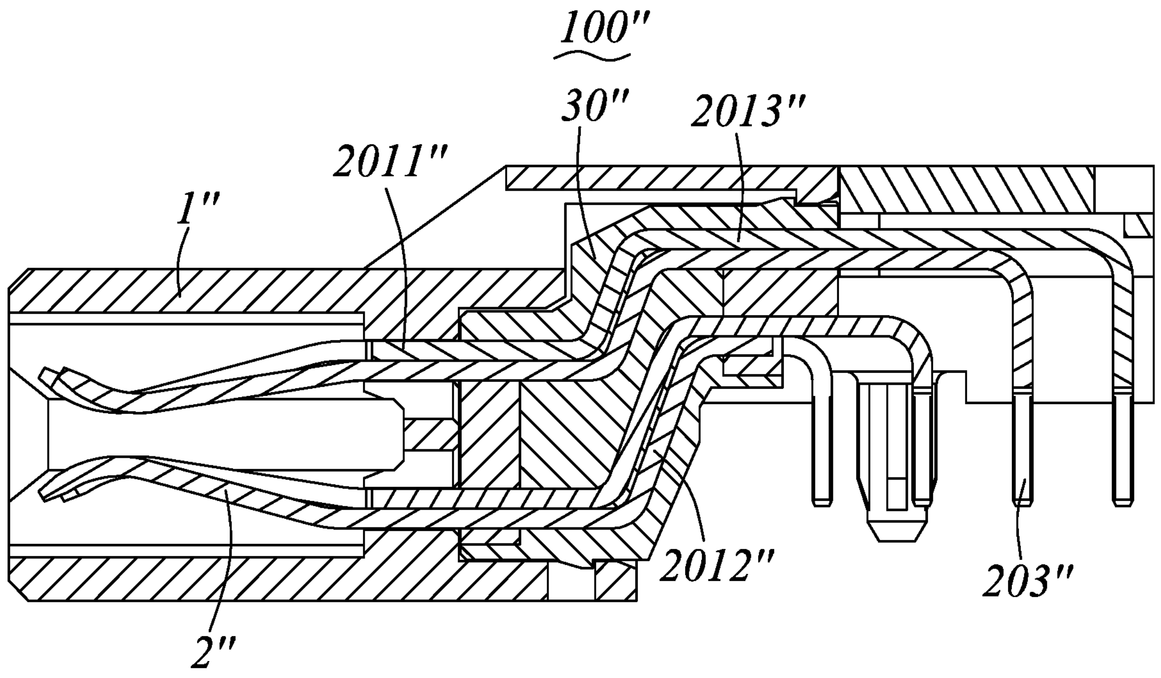
FIG. 21 is a cross-sectional view of the electrical connector after assembled shown in FIG. 19.

FIGS. 19 to 21 illustrate an electrical connector 100" in a third embodiment of the present invention, and the electrical connector 100" includes an insulating housing 1", a plurality of power contact pairs 2" retained in the insulating housing 1", an insulative component 3", a plurality of signal contacts 4", a spacer 5" and a cover 6". Herein, the insulating housing 1", the power contact pairs 2", the signal contacts 4", the spacer 5" and the cover 6" are similar or same as that of the first embodiment, so the description for them is omitted here for the second embodiment. The difference between the two embodiments is explained as follows.

Same as the first embodiment, the power contact pairs 2" are arranged in pairs along a height direction to form a group, the two power contact pairs 2" in each group are opposite to and spaced apart from each other in the height direction. The contacting portions 202" of two power contacts 21" in each power contact pair 2" are arranged alternately in a transverse direction. In each row of the power contact pairs 2", the soldering legs 203" are arranged in two rows in a front-and-back direction, and the soldering legs 203" in each row are arranged in a line along the transverse direction.

Being different from the first embodiment, in present third embodiment, the insulative component 3" includes a plurality of insulators 30" which are arranged side by side in a transverse direction. In each group of power contact pairs 2", the inclined part 2012" and at least one part of the first and second horizontal part 2011", 2013" of the power contact pairs 2" are embedded together in a same insulator 30" to form a contact module, and a plurality of the contact modules are arranged abreast and are assembled into the insulating housing 1".

The electrical connector 100, 100', 100" in all embodiments mentioned above have a low center height in order to mate with the complementary member electrically. The power contact pairs 2, 2', 2" are arranged in at least two rows in the height direction. Each pair of power contacts 2, 2', 2" in each row includes two power contacts 21, 21', 21", the power contact pairs 2, 2', 2" are retained in the insulative component 3, 3', 3" and then assembled into the insulating housing 1, 1', 1" from a back side, so that the power contacts 21, 21', 21" in a multiple-piece arrangement along the height direction can be bended downwardly to form the soldering legs 203, 203', 203" and can be assembled into the insulating housing 1, 1', 1" conveniently. Therefore, the electrical connector 100, 100', 100" be able to transmit large current with a lower overall height and a lower center height, and meanwhile it also resolves the problem that the multiple rows of power contacts are difficult to assemble into the insulating housing 1, 1', 1".

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector, comprising:

an insulating housing having a mating cavity; and a contact module defined in the insulating housing, and comprising at least one contact group and an insulative component retaining the contact group, the one contact group having at least a first power contact and at least a second power contact, each one of the first power contact and the second power contact having a retaining portion held in the insulative component, at least one contacting portion extending beyond the insulative component from one end of the retaining portion and at least one soldering portion extending from another end of the retaining portion;

wherein the retaining portions of the first power contact and the second power contact in one contact group are arranged in a height direction of the insulating housing in the insulative component, the contacting portions of the first power contact and the second power contact in one contact group are arranged in a transverse direction of the insulating housing, the soldering portions of the first power contact and the second power contact in one contact group are arranged in a front-and-back direction.

2. The electrical connector as claimed in claim 1, wherein the insulating housing has a mating section and a mounting section connecting with each other in the front-and-back direction, the mating cavity is formed in the mating section, the mounting section has a mounting surface for mounting onto a printed circuit board, and in the height direction, the mounting surface is not lower than a horizontal center plane of the mating section.

3. The electrical connector as claimed in claim 2, wherein the electrical connector has a plurality of contact groups, the contacting portions of the contact groups are exposed in the mating cavity and are symmetrically disposed on both sides of the horizontal center surface of the mating section in the height direction.

4. The electrical connector as claimed in claim 1, wherein the insulative component has a plurality of retaining slots for fixing the retaining portions of the contact group, the contact group and the insulative component are forming the contact module and then assembled into the insulating housing.

5. The electrical connector as claimed in claim 4, wherein the insulative component a first insulative piece and a second insulative piece engaged with each other, the retaining slots comprise a plurality of first retaining slots and a plurality of second retaining slots formed both in the first insulative piece and the second insulative piece, the first retaining slots and the second retaining slots are separated from each other along the height direction.

6. The electrical connector as claimed in claim 1, wherein the mounting section defines a mounting space opening backwards, a supporting wall located at a bottom position of the mounting space and a cover located on a top side of the mounting space, the insulative component is limited by the cover and the supporting wall, the supporting wall is provided with a positioning structure to limit the insulative component along a front-and-back direction.

7. An electrical connector, comprising:

an insulating housing defining a mating section and a mounting section connecting with each other in a front-and-back direction, the mounting section having a mounting surface for mounting onto a printed circuit board;

a plurality of power contacts, each power contact having a retaining portion, at least one contacting portion extending from one end of the retaining portion and at least one soldering portion extending from another end of the retaining portion, each retaining portion defining an extended part higher than the mounting surface, and the soldering portion bent from the extended part; and at least one insulative component retaining the power contacts;

wherein in a height direction of the insulating housing, the power contacts are defined in pairs and opposite to each other at the mating section, the extended parts of the power contacts on a lower side are not lower than a plane where the contacting portions of the power contacts on an upper side is located, the power contacts and the insulative component are forming a contact module and then assembled into the insulating housing in a back-to-front direction, the insulative component defines a plurality of retaining slots for mounting the retaining portions of the power contacts, the contacting portions extend beyond a front end of the insulative component and to the mating section.

8. The electrical connector as claimed in claim 7, wherein the mounting section defines a mounting space opening backwards, a supporting wall located at a bottom position of the mounting space and a cover located on a top side of the mounting space, the insulative component is limited by the cover and the supporting wall, the supporting wall is provided with a positioning structure to limit the insulative component along a front-and-back direction.

9. The electrical connector as claimed in claim 8, wherein the insulating housing further has a limiting wall which is jointly with the supporting wall to limit the insulative component in the height direction, the cover is assembled on a rear side of the insulative component to limit its movement in the front-and-back direction.

10. The electrical connector as claimed in claim 7, wherein the insulative component a first insulative piece and a second insulative piece engaged with each other, the retaining slots comprise a plurality of first retaining slots and a plurality of second retaining slots formed both in the first insulative piece and the second insulative piece, the first retaining slots and the second retaining slots are separated from each other along the height direction.

11. The electrical connector as claimed in claim 7, wherein the power contacts in pairs are mounted on a same insulative component, and one of the insulative component comprises a first insulative piece and a second insulative piece fastening with each other in a transverse direction, each one of the first insulative piece and second insulative piece has a first retaining slot and a second retaining slot spaced apart from each other along the height direction, to separately install the power contacts whose contacting portions on opposite sides of a horizontal center of the mating section.

12. The electrical connector as claimed in claim 7, wherein the insulative component comprises a first insulative piece and a second insulative piece assembled with each other in the height direction, each one of the first insulative piece and the second insulative piece has a plurality of retaining slots at transverse intervals, to fix the power contacts whose contacting portions on an upper side and the power contacts whose contacting portions on a lower side respectively.

13. The electrical connector as claimed in claim 12, wherein each retaining portion further has a plate part located on a lower side of the extended part, the retaining slots comprise a plurality of first retaining slots and a plurality of second retaining slots separated from each other along the height direction, to position the plate part and the extended part.

14. An electrical connector, comprising:

an insulating housing having a mounting section, a mating section extending forwardly from the mounting section and a plurality of contact-receiving passageways;

a plurality of power contact pairs retained in the insulating housing and divided into at least two rows along a height direction, each power contact pair in each row having at least two pieces of power contacts, each power contact having a retaining portion held in the relative contact-receiving passageway, at least a contacting portion extending forwards from the retaining portion and at least a soldering portion bending from a rear end of the retaining portion; and an insulative component retaining the power contact pairs;

wherein the power contact pairs are fixed in the insulative component in advance and then assembled into the insulating housing forwardly as a whole, the retaining portions of two power contacts in each power contact pair are arranged in the height direction, soldering portions of the power contacts are arranged in four rows along a front-and-back direction, the mounting section has a mounting surface for mounting onto a printed circuit board, and in the height direction, the mounting surface is not lower than a horizontal center plane of the mating section.

15. An electrical connector, comprising:

an insulating housing extending in a longitudinal direction;

a plurality of terminal groups each of which having at least two power contact pairs spaced apart from each other in a height direction, each power contact pair consisting of at least two power contacts arranged in the height direction; and an insulative component defining a first insulative piece and a second insulative piece both of which retaining a plurality of the power contact pairs;

wherein the first insulative piece and second insulative piece are stacked with each other along a height direction to form a contact module which can be assembled into the insulating housing.

16. The electrical connector as claimed in claim 15, wherein the insulating housing has a supporting wall to support the insulative component upwardly, the supporting wall has a plurality of retaining holes formed on a top surface thereon while the insulative component has a plurality of retaining protrusions protruding downwardly from a bottom surface thereon, the retaining protrusions are retained in the retaining holes.

17. The electrical connector as claimed in claim 16, wherein the electrical connector further comprises a cover located on a top side of the terminal groups, the cover has a plurality of separating ribs protruding downwardly to separate two adjacent terminal groups in the longitudinal direction.

18. An electrical connector, comprising:

an insulating housing extending in a longitudinal direction;

a plurality of terminal groups each of which including at least two power contact pairs arranged in a height direction, each power contact pair consisting of at least two power contacts arranged in the height direction; and an insulative component defining a plurality of first insulative pieces and a plurality of second insulative pieces;

wherein each first insulative piece engages with the corresponding second insulative piece horizontally to form a contact module with a terminal group retained inside, a plurality of the contact modules are arranged side by side in the longitudinal direction, the first insulative piece clamps one side of the two power contact pairs in advance while the second insulative piece clamps another side subsequently.

19. The electrical connector as claimed in claim 18, wherein each first insulative piece has a first retaining slot, a second retaining slot and a protruding portion located between the first retaining slot and second retaining slot, the protruding portion protrudes in the longitudinal direction to engage with the second insulative piece.

20. The electrical connector as claimed in claim 19, wherein at least one of the first insulative piece and the second insulative piece has a retaining protrusion protruding from a bottom surface thereof which can be retained in a retaining hole of the insulating housing.

* * * * *